United States Patent
Nagao et al.

(10) Patent No.: US 8,332,671 B2
(45) Date of Patent: Dec. 11, 2012

(54) POWER SUPPLY DEVICE, AND REMOTE CONTROL DEVICE THEREOF

(75) Inventors: Naoyuki Nagao, Shinagawa (JP); Shinichi Katayama, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 192 days.

(21) Appl. No.: 12/840,328

(22) Filed: Jul. 21, 2010

(65) Prior Publication Data
US 2011/0022862 A1  Jan. 27, 2011

(30) Foreign Application Priority Data

Jul. 23, 2009 (JP) ................... 2009-172518
Jul. 23, 2009 (JP) ................... 2009-172519

(51) Int. Cl.
*G06F 1/00* (2006.01)

(52) U.S. Cl. ....................... 713/310; 713/324

(58) Field of Classification Search .......... 713/300–320, 713/324, 340
See application file for complete search history.

(56) References Cited

U.S. PATENT DOCUMENTS

| 2009/0179490 A1 | 7/2009 | Nagao |
| 2011/0126032 A1* | 5/2011 | Khan et al. ............. 713/310 |

FOREIGN PATENT DOCUMENTS

| CN | 101192760 | 6/2008 |
| JP | 02-096444 | 4/1990 |
| JP | 02-183693 | 7/1990 |
| JP | 02-272954 | 11/1990 |
| KR | 10-2000-0012048 | 2/2000 |
| KR | 10-2009-0077724 | 7/2009 |

OTHER PUBLICATIONS

In-Chul Hwang, Oh Yang, "The Implementation of Remote Control and Monitoring System for Boost-Converter Using Ethernet Communication," Summer Annual Conference of the Korean Institute of Electrical Engineers, pp. 1670 and 1671, Jul. 18, 2007.
Office Action dated Apr. 25, 2012 issued with respect to the corresponding Korean Patent Application No. 10-2010-0071680.

* cited by examiner

*Primary Examiner* — Clifford Knoll
(74) *Attorney, Agent, or Firm* — IPUSA, PLLC

(57) ABSTRACT

A disclosed power supply device includes a power supply unit configured to switch supply or non-supply of power from an external power supply to an electronic apparatus, and a receiving unit configured to receive a control command for controlling the switching with the power supply unit from a remote controller.

7 Claims, 21 Drawing Sheets

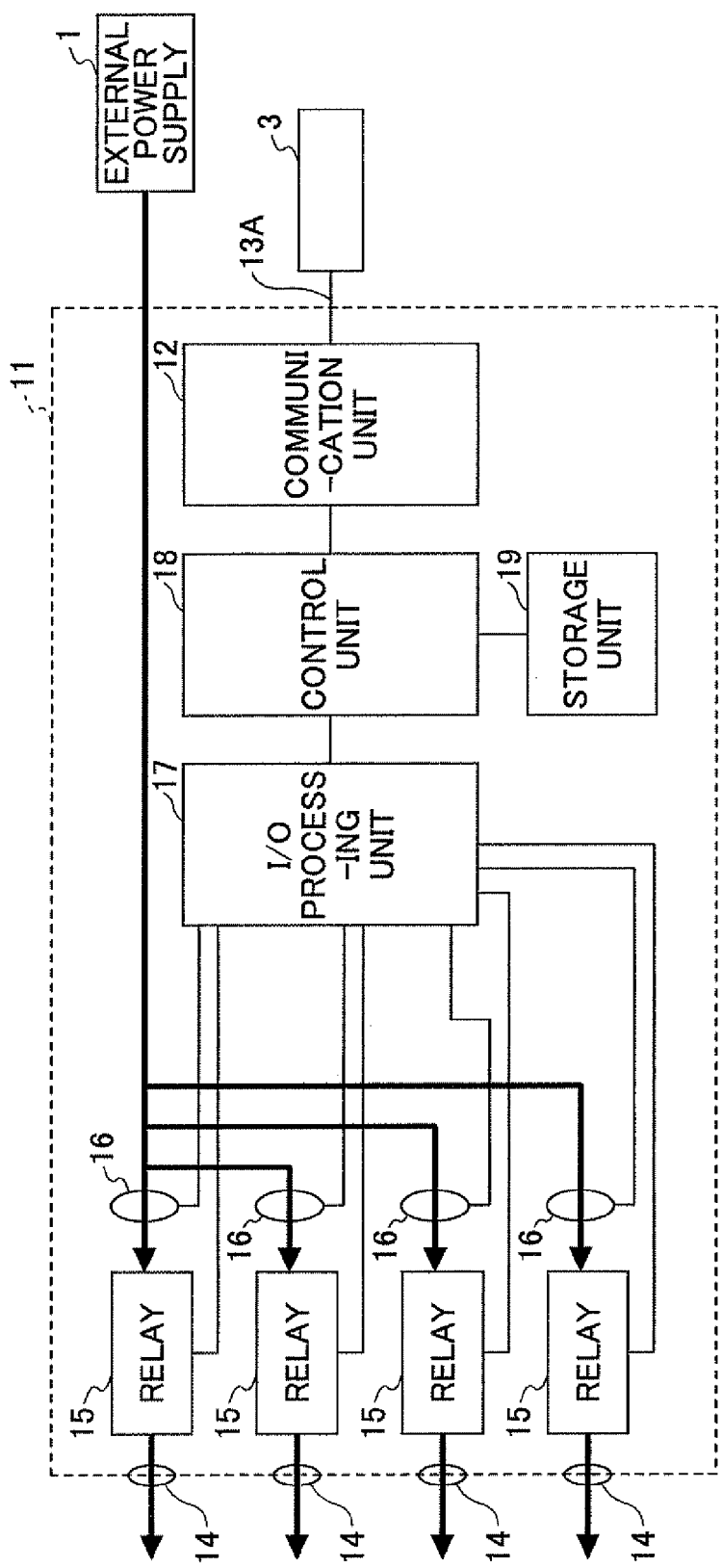

FIG.4A

| UNIT NUMBER | IP ADDRESS |
|---|---|
| k | 123.456.x.y |

FIG.4B

| PORT NUMBER | SAMPLED DATA |
|---|---|
| 1 | 1X |
| 2 | 2X |
| 3 | 3X |
| 4 | 4X |

FIG.6A

| UNIT NUMBER | IP ADDRESS |
|---|---|
| 1 | 123.456.7.8 |
| ⋮ | ⋮ |
| n | 123.456.x.y |

FIG.6B

| UNIT NUMBER | PORT NUMBER | SAMPLED DATA |
|---|---|---|
| 1 | 1 | 1X |
| | 2 | 2X |
| | 3 | 3X |
| | 4 | 4X |
| ⋮ | ⋮ | ⋮ |
| n | 1 | 1X |
| | 2 | 2X |
| | 3 | 3X |
| | 4 | 4X |

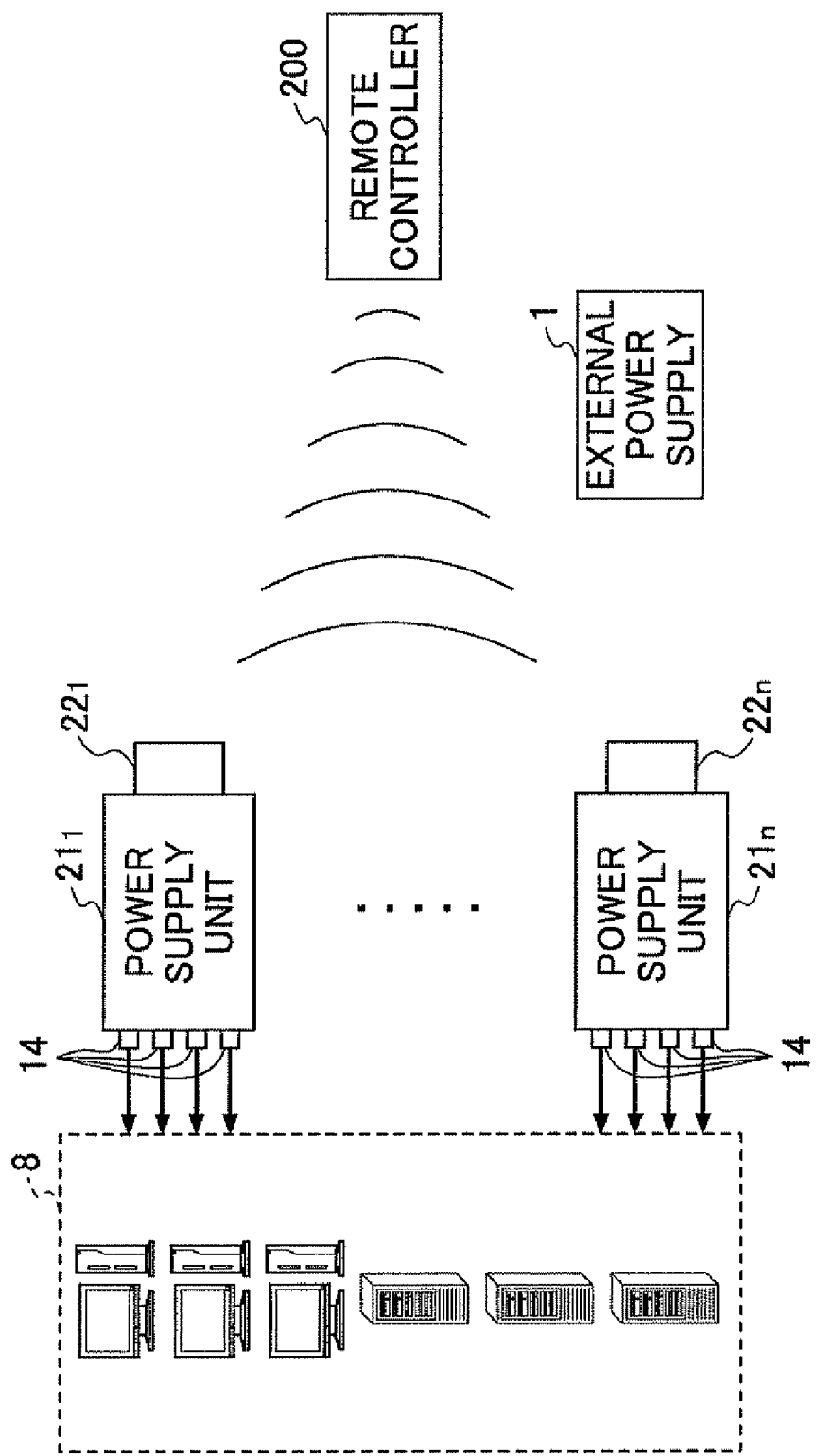

FIG.16

| ORDER | NAME | IP ADDRESS | MAC ADDRESS | PORT NUMBER |
|---|---|---|---|---|
| 1 | POWER SUPPLY UNIT 31l | 192.168.1.26 | XX:XX:XX:FF:FF:01 | 4 |
| 2 | POWER SUPPLY UNIT 31k | 192.168.1.31 | XX:XX:XX:FF:FF:0K | 1 |
| 3 | POWER SUPPLY UNIT 31n | 192.168.1.15 | XX:XX:XX:FF:FF:0N | 2 |
| 4 | POWER SUPPLY UNIT 31n | 192.168.1.15 | XX:XX:XX:FF:FF:0N | 1 |
| 5 | POWER SUPPLY UNIT 31k | 192.168.1.31 | XX:XX:XX:FF:FF:0K | 2 |
| 6 | POWER SUPPLY UNIT 31l | 192.168.1.26 | XX:XX:XX:FF:FF:01 | 3 |
| 7 | POWER SUPPLY UNIT 31k | 192.168.1.31 | XX:XX:XX:FF:FF:0K | 4 |
| 8 | POWER SUPPLY UNIT 31n | 192.168.1.15 | XX:XX:XX:FF:FF:0N | 3 |
| 9 | POWER SUPPLY UNIT 31l | 192.168.1.26 | XX:XX:XX:FF:FF:01 | 1 |
| 10 | POWER SUPPLY UNIT 31k | 192.168.1.31 | XX:XX:XX:FF:FF:0K | 3 |
| 11 | POWER SUPPLY UNIT 31n | 192.168.1.15 | XX:XX:XX:FF:FF:0N | 4 |
| 12 | POWER SUPPLY UNIT 31l | 192.168.1.26 | XX:XX:XX:FF:FF:01 | 2 |
| ... | ... | ... | ... | ... |

POWER SUPPLY DEVICE, AND REMOTE CONTROL DEVICE THEREOF

CROSS-REFERENCE TO RELATED APPLICATIONS

This patent application is based upon and claims the benefit of priorities of the prior Japanese Patent Applications No. 2009-172518 filed on Jul. 23, 2009 and No. 2009-172519 filed on Jul. 23, 2009, the entire contents of which are incorporated herein by reference.

FIELD

The embodiments discussed herein are related to a power supply device for supplying power to electronic apparatuses, and a remote controller used for the power supply device.

BACKGROUND

A certain aspect of the embodiments discussed herein is related to a power supply device for supplying electric power supplied from an external power supply to electronic apparatuses such as a personal computer (PC), a server, and a monitor.

For example, referring to FIG. 1, the power supply device may include power supply units $2_1$ to $2_n$ (n is an arbitrary integer) which are supplied with power by an external power supply 1, and a personal computer (PC) 6 for remote control which is connected to the external power supply 1 via a hub 3, a communication line 4 such as the Internet, and a hub 5.

Local area network (LAN) cables connect the power supply units $2_1$ to $2_n$ and the hub 5 and the PC 6.

The power supply units $2_1$ to $2_n$ include plural ports 7 which distribute power supplied from the external power supply 1. The electronic apparatuses such as a PC, a server and a monitor are connected to the ports 7. The power supply units $2_1$ to $2_n$ include built-in relays such as an electric relay which can connect and disconnect the ports 7 and the external power supply 1.

When an operator inputs to the PC 6 to select one of the power supply units $2_1$ to $2_n$ and one of its ports 7, a control command corresponding to the input is input to the selected power supply unit among the power supply units $2_1$ to $2_n$ through the PC 6 and the communication line 4. Thus, the electric relay inside the power supply unit is connected to the port 7 identified by the control command. Then, power is supplied from the port 7 to the electronic apparatus 8 such as the PC, the server and the monitor as described in Japanese Laid-open Patent Publication No. 2-272954, Japanese Laid-open Patent Publication No. 2-183693 and Japanese Laid-open Patent Publication No. 2-096444.

SUMMARY

According to an aspect of the embodiment, there is provided a power supply device including a power supply unit configured to switch supply or non-supply of power from an external power supply to an electronic apparatus, and a receiving unit configured to receive a control command for controlling the switching of the power supply unit using a remote controller.

The object and advantages of the embodiments will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF THE DRAWINGS

FIG. 3 schematically illustrates an example configuration of a power supply unit of Embodiment 1;

FIG. 4A is a table schematically illustrating an IF address stored in a storage unit of the power supply unit of Embodiment 1;

FIG. 4B is a table schematically illustrating sampled data stored in the storage unit of the power supply unit of Embodiment 1;

FIG. 6A is a table schematically illustrating IP addresses stored in a storage unit of the remote controller of Embodiment 1;

FIG. 6B is a table schematically illustrating sampled data stored in a storage unit the remote controller of Embodiment 1;

FIG. 10 schematically illustrates an example configuration of a power supply device of Embodiment 2;

FIG. 16 is a table schematically illustrating data stored in a storage unit of the remote controller of Embodiment 3;

DESCRIPTION OF EMBODIMENT(S)

Hereinafter, power supply devices and remote controllers used for the power supply devices of Embodiments 1 to 3 are described with reference to accompanying drawings.

Embodiment 1

Figure 2:
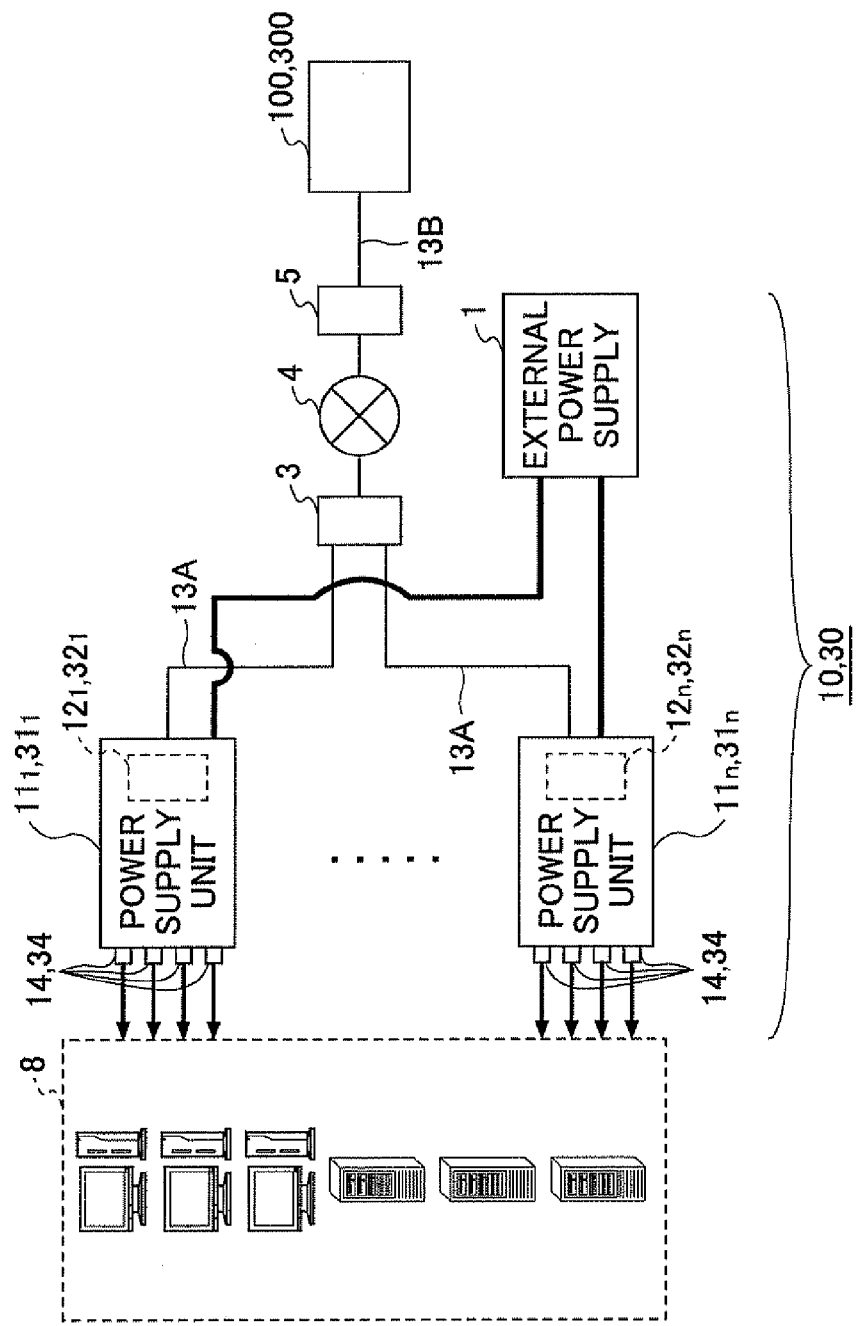
FIG. 2 schematically illustrates an example configuration of a power supply device of Embodiments 1 and 3.

FIG. 2 schematically illustrates an example configuration of a power supply device 10 of Embodiment 1.

The power supply device 10 of Embodiment 1 includes power supply units $11_1$ to $11_n$ and communication units $12_1$ to $12_n$ functioning to receive power supply commands. The communication units $12_1$ to $12_n$ are installed in the corresponding power supply units $11_1$ to $11_n$. In this, n is an arbitrary integer and represents the unit numbers of the power supply units 11.

Hereinafter, when the power supply units $11_1$ to $11_n$ are not discriminated, the power supply units are representatively or collectively referred to as a power supply unit 11 or power supply units 11. In a similar manner, when the communication units $12_1$ to $12_n$ are not discriminated, the communication units are representatively or collectively referred to as a communication unit 12 or communication units 12. Although plural power supply units 11 and communication units 12 are illustrated in FIG. 2, the numbers of the power supply units 11 and the communication units 12 may be at least one. The communication units $12_1$ to $12_n$ may be installed inside or outside the power supply units $11_1$ to $11_n$.

The power supply units $11_1$ to $11_n$ include plural ports 14 which distribute power supplied from an external power supply 1. Electronic apparatuses 8 such as a PC, a server and a monitor are connected to the ports 14. The power supply units $11_1$ to $11_n$ switch supply or non-supply of power supplied from the external power supply 1 to the electronic apparatuses 8. The number of the ports 14 is not limited to four and may be at least one.

The communication units $12_1$ to $12_n$ are connected to a remote controller 100 via LAN cables 13A, hubs 3 and 5, a communication line 4 such as the Internet, and a LAN cable 13B. The communication units $12_1$ to $12_n$ function as interfaces which receive control commands for controlling switching of the power supply units $11_1$ to $11_n$ from the remote controller 100. An example internal configuration of the power supply unit 11 of Embodiment 1 is described below in reference to FIG. 3.

The remote controller 100 transmits the control command to the power supply device 10 of Embodiment 1. Detailed explanation of the remote controller 100 is given in reference to FIG. 5 later.

Referring to FIG. 3, the respective power supply units 11 include four relays 15 connected to the external power source 1. The ports 14 are connected on the output sides of the relays 15. The power supply unit 11 includes current sensors 16, an Input/Output (I/O) processing unit 17, a control unit 18, and a storage unit 19 in addition to the communication unit 12, the ports 14, and the relays 15.

The current sensor 16 is an electric current detector which detects a current value supplied to the corresponding relay 15 from the external power supply 1. Signals indicative of the electric current values detected by the current sensors 16 are input to the control unit 18 via the I/O processing unit 17.

The I/O processing unit 17 switches turning-on or turning-off of the relays 15 based on the control command input from the control unit 18, and inputs the current values detected by the respective current sensors 16 to the control unit 18.

The control unit 18 mainly carries out a control process for driving the power supply unit 11. A central processing unit (CPU) may constitute the control unit 18. The control unit 18 carries out at least a process of generating the control command for controlling switching of the power supply unit 11 based on the control signal input from the remote controller 100 via the communication unit 12, and a process of comparing the current value input from the current sensors 16 via the I/O processing unit 17 with a predetermined value and detecting overcurrent.

A CPU may constitute the control unit 18, the communication unit 12 and the I/O processing unit 17.

The storage unit 19 stores data for driving the power supply unit 11. A nonvolatile memory may constitute the storage unit 19. At least an Internet Protocol (IP) address for identifying one of the power supply units $11_1$ to $11_n$ and sampled data for selecting the four relays 15 are stored in the storage unit 19.

FIG. 4A is a table schematically illustrating the IP address stored in the storage unit 19 of the power supply unit 11 of Embodiment 1. FIG. 4B is a table schematically illustrating the sampled data stored in the storage unit 19 of the power supply unit 11 of Embodiment 1. The IP address as the identification information of the power supply unit 11 and the sampled data may be partly or totally acquired from the power supply unit 11 via the communication unit 12.

The IP address of the power supply units $11_1$ to $11_n$ are allocated to the corresponding power supply units $11_1$ to $11_n$. The IP address inherent in the power supply unit 11 is stored in the storage unit 19 of the power supply unit 11 in association with the unit number as illustrated in FIG. 4A. FIG. 4A illustrates the IP address "123.456.x.y" (x and y are arbitrary numbers) of the power supply unit $11_k$ having the unit number k being an integer satisfying $1 \leq k \leq n$.

The sampled data are used for turning-on or turning-off of the four ports 14 of the power supply unit 11 identified by the IP address. The sampled data are included in the control command received from the remote controller 100.

The sampled data include two digit numbers 1X, 2X, 3X and 4X respectively allocated to the first port, the second port, the third port and the fourth port 14. The tens places of the two digit numbers 1X, 2X, 3X and 4X designate the port number of the ports 14, and the ones places X of the two digit numbers 1X, 2X, 3X and 4X designate the port status. 0 or 1 is input as X. When the port 14 is turned off, 0 is input to X, and when the port 14 is turned on, 1 is input to X. Referring to FIG. 4B, the storage unit 19 of the power supply unit 11 stores the sampled data included in the control command received from the remote controller 100.

Figure 5A:
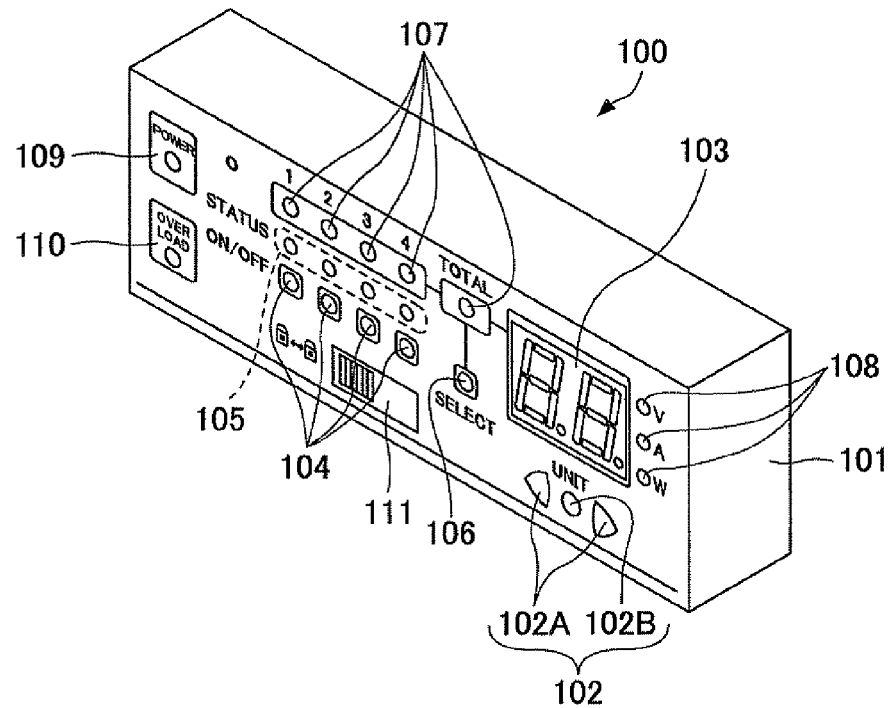
FIG. 5A is a perspective view illustrating a remote controller used in the power supply device of Embodiment 1.
Figure 5B:
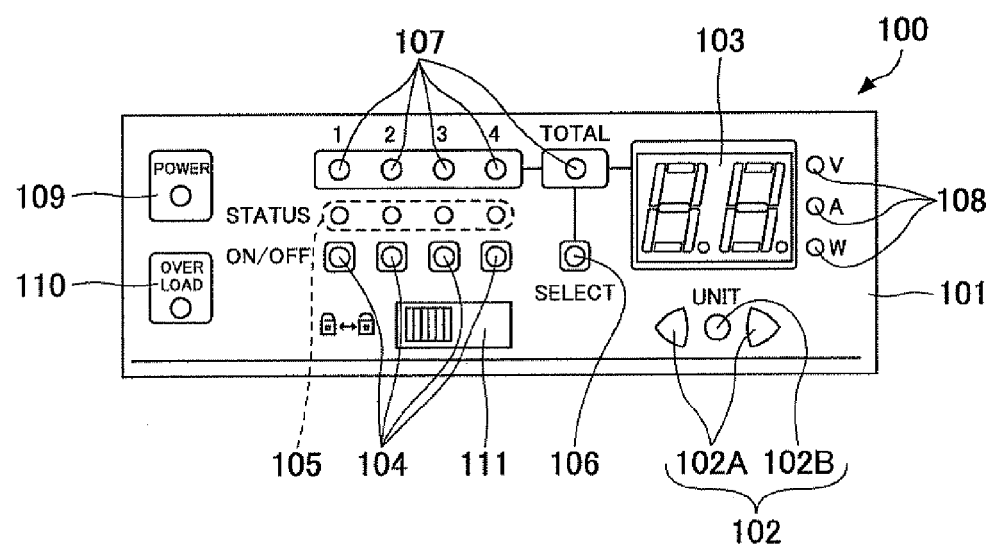
FIG. 5B is a front view illustrating the remote controller used in the power supply device of Embodiment 1.
Figure 5C:
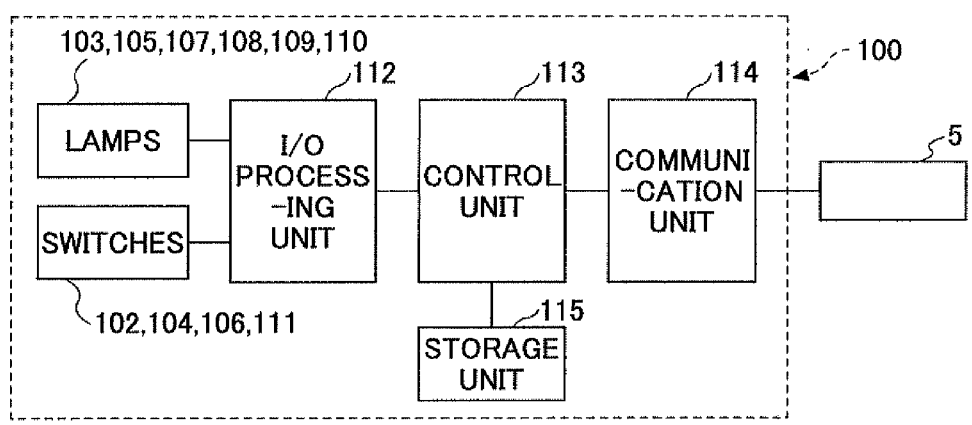
FIG. 5C is a block diagram illustrating an inner configuration of the remote controller used in the power supply device of Embodiment 1.

FIG. 5A is a perspective view illustrating the remote controller 100 used in the power supply device 10 of Embodiment 1. FIG. 5B is a front view illustrating the remote controller 100 used in the power supply device 10 of Embodiment 1. FIG. 5C is a block diagram illustrating an inner configuration of the remote controller 100 used in the power supply device 10 of Embodiment 1.

Referring to FIG. 5A and FIG. 5B, the remote controller 100 includes a casing 101, unit selection buttons 102 (102A, 102B) a display unit 103, port on/off buttons 104, a status indicating lamp 105, a display selection button 106, port indication lamps 107, unit indication lamps 108, a power lamp 109, an overcurrent warning lamp 110, and a hold switch 111.

The casing 101 may have a plastic rectangular solid like body having a cavity in it. The unit selection buttons 102 (102A, 102B), the display unit 103, the port on/off buttons 104, the status indicating lamp 105, the display selection button 106, the port indication lamps 107, the unit indication lamps 108, the power lamp 109, the overcurrent warning lamp 110, and the hold switch 111 are exposed on the outside of the casing.

The unit selection buttons 102 include a selection button 102A and a confirmation button 102B for selecting the power supply units $11_1$ to $11_n$. The selection button 102A is a pair of buttons shaped like triangles for selecting the unit number n of the power supply units $11_1$ to $11_n$. The unit number n selected with the selection button 102A is displayed on the display unit 103. The confirmation button 102B is provided to confirm the unit number n selected in the selection button 102A.

A liquid crystal panel for displaying the unit number of the power supply unit 11 to be selected, and a voltage value, a current value, an output value and the like of the port 14 selected by the display selection button 106 constitutes the display unit 103.

The port on/off buttons 104 are provided to turn on or off the four ports 14 of the power supply unit 11 selected by the unit selection button 102.

The status indicating lamps 105 include four light emitting diodes (LED) corresponding to the four ports 14 of the power supply unit 11. The LED corresponding to the port which is turned on by the port on/off button 104 is lit.

The display selection button 106 is a button switch provided to select the port 14 for displaying the current value and the like on the display unit 103. It is possible to select the first port, the second port, the third port and the fourth port 14 in this order for every pressing of this button switch. When the display selection button 106 is pushed again while selecting the fourth port, it is possible to select a mode of displaying the sum of the current values of the first to fourth ports. When the display selection button 106 is pushed again after all of the first to fourth ports are selected, the first port can be selected.

The port indication lamps 107 include four LEDs corresponding to the four ports 14 and an additional LED indicated by "TOTAL" in FIG. 5B and used when all of the four ports 14 are selected. The number of the LEDs for the port indication lamps 107 is five in FIGS. 5A and 5B. When any one of the four ports 14 of the power supply unit 11 is selected, the corresponding LED of the port indication lamps 107 is lit. When all of the four ports 14 of the power supply unit 11 are selected, the additional LED "TOTAL" of the port indication lamps 107 is lit.

The unit indication lamps 108 may be LEDs for indicating units (V), (A) or (W) of the numbers displayed on the display unit 103 in order to indicate properties, i.e. voltage, current and output, of the numbers displayed on the display unit 103. The display on the display unit 103 may be automatically switched in the order of voltage, current and output by the control unit inside the remote controller 100. The unit indication lamps 108 are automatically switched over.

The power lamp 109 is a LED indicating that the remote controller 100 is being charged. The power lamp 109 is lit when the remote controller 100 is charged via a power cord (not illustrated).

The overcurrent warning lamp 110 is a LED which is lit when there is generation of overcurrent. The overcurrent warning lamp 110 is lit by the control unit inside the remote controller 100 when the overcurrent is detected by the control unit 18 of the power supply unit 11 and the remote controller 100 receives a signal indicative of the overcurrent from the power supply unit 11.

The hold switch 111 is provided to switch between holding and non-holding in order to prevent operation of the remote controller 100. When the hold switch 111 is switched to holding, operation of the remote controller is not accepted.

Referring to FIG. 5C, the remote controller 100 includes an I/O processing unit 112, a control unit 113, a communication unit 114, a storage unit 115, lamps 103, 105, 107, 108, 109 and 110 and switches 102, 104, 106 and 111.

The lamps include the display unit 103, the status indicating lamp 105, the port indication lamp 107, the unit indication lamp 108, the power lamp 109 and the overcurrent warning lamp 110. The switches include the unit selection button 102(102A, 102B), the port on/off button 104, the display selection button 106 and the hold switch 111.

The I/O processing unit 112 carries out a process of lighting the lamps and inputting signals indicative of input operations applied to the switches to the control unit 113 based on the command input from the control unit 113.

The control unit 113 generates and outputs control commands corresponding to the input operations applied to the switches and the lighting of the lamps in response to the input operations. A CPU may constitute the control unit 113.

The communication unit 114 outputs the control commands generated by the control unit 113. The communication unit 114 functions as an interface for transferring the control commands to the power supply unit 11 via the hub 5, the communication line 4 and the hub 3.

A storage unit 115 may be a memory for storing the data indicative of the IP addresses of the power supply units $11_1$ to $11_n$ and the port numbers 14. The storage unit may be a nonvolatile memory.

The CPU may constitute the I/O processing unit 112, the control unit 113 and the communication unit 114.

FIG. 6A is a table schematically illustrating IP addresses stored in the storage unit 115 of the remote controller 100 of Embodiment 1. FIG. 6B is a table schematically illustrating sampled data stored in the storage unit 115 of the remote controller 100 of Embodiment 1. The IP addresses as the identification information of the power supply units 11 and the sampled data may be partly or totally acquired from the power supply units 11 via the communication units 12.

Referring to FIG. 6A, the storage unit 115 of the remote controller 100 stores identification information such as the IP addresses of the power supply units $11_1$ to $11_n$ in association with the unit numbers 1 to n.

Referring to FIG. 6B, the sampled data are two digits numbers 1X, 2X, 3X and 4X allocated to the first to fourth ports 14 respectively for each of the power supply units 11. The sampled data illustrated in FIG. 6B include data about all of the ports of all of the power supply units 11 to be controlled by the remote controller 100.

When the remote controller 100 is operated to designate the unit number, the port number and turning-on or turning-off of the ports 14, the signals indicative of the operations are input to the control unit 113. The control unit 113 sets 0 or 1 to X on the ones place of the sampled data corresponding to the designated unit number and the port number. The set sampled data are output from the communication unit 114 by the control unit 113 along with the data indicative of the unit number and the port number.

Figure 7:
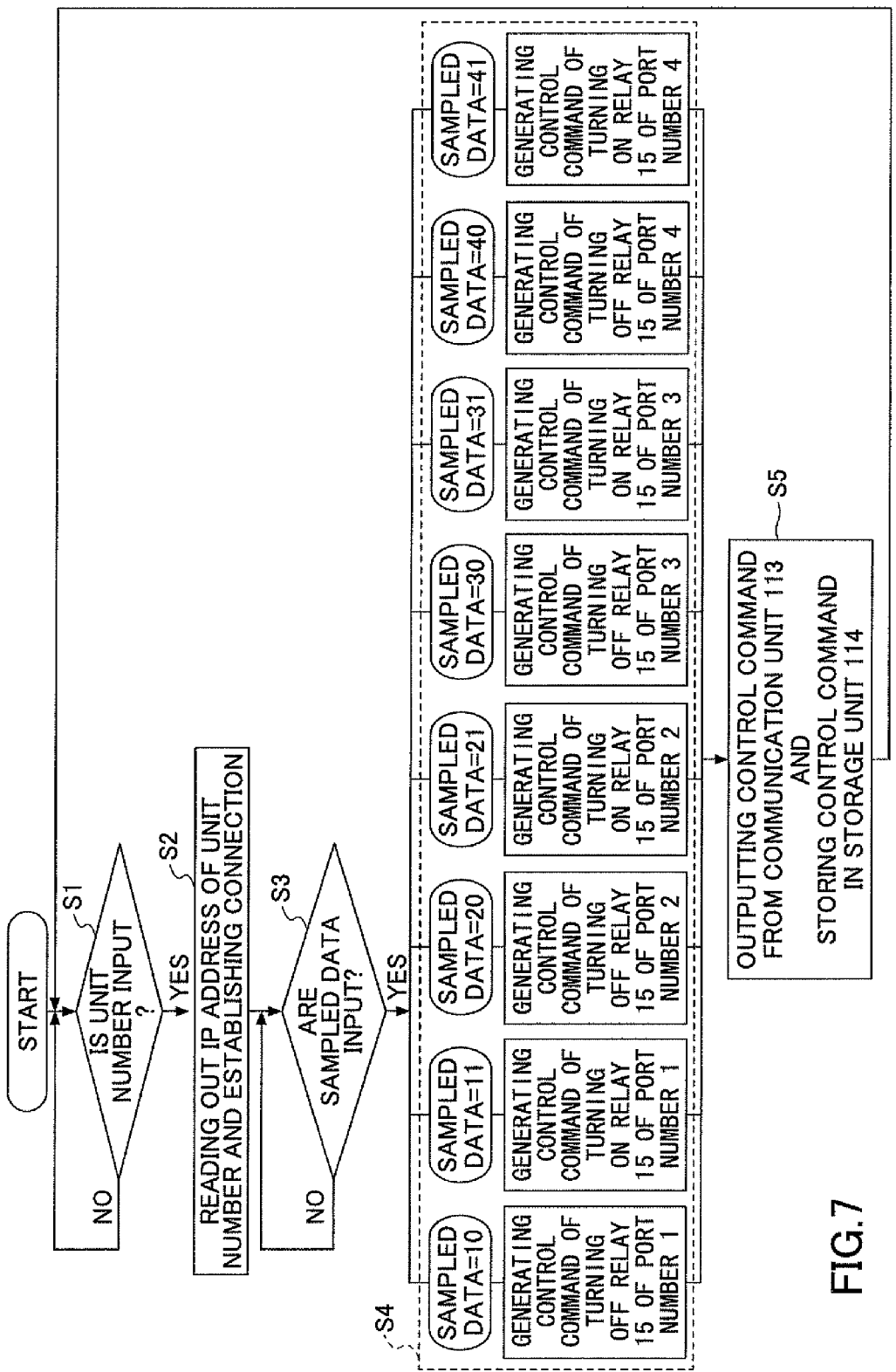
FIG. 7 is a flowchart illustrating a transmission process of a control command with the remote controller used for the power supply device of Embodiment 1.

FIG. 7 is a flowchart illustrating a transmission process of the control command with the remote controller 100 used for the power supply device 10 of Embodiment 1. The transmission process is carried out by the control unit 113 of the remote controller 100.

The control unit 113 determines whether a unit number is input in step S1. Because a different IP address is allocated to a different unit number, a connection between the power supply unit 11 and the control unit 113 of the remote controller 100 is established after the IP address of the power supply unit 11 is identified. Step S1 is repeated until the unit number is input.

When the unit number is input, the control unit 113 reads out an IP address associated with the input unit number from the database illustrated in FIG. 6A and stored in the storage unit 115, and the connection with the power supply unit 11 is established by the communication unit 114 in step S2.

The control unit 113 determines whether the sampled data for selecting the port 14 are input in step S3. Step S3 is repeated until the sampled data are input.

The control unit 113 generates a control command for turning on or off the relay corresponding to the port number indicated by the sampled number in step S4.

The control unit 113 specifically generates a control command of turning off the relay 15 corresponding to the port number 1 when the sampled data is "10". The control unit 113 specifically generates a control command of turning on the relay 15 corresponding to the port number 1 when the sampled data is "11". The control unit 113 specifically generates a control command of turning off the relay 15 corresponding to the port number 2 when the sampled data is "20". The control unit 113 specifically generates a control command of turning on the relay 15 corresponding to the port number 2 when the sampled data is "21". The control unit 113 specifically generates a control command of turning off the relay 15 corresponding to the port number 3 when the sampled data is "30". The control unit 113 specifically generates a control command of turning on the relay 15 corresponding to the port number 3 when the sampled data is "31". The control unit 113 specifically generates a control command of turning off the relay 15 corresponding to the port number 4 when the sampled data is "40". The control unit 113 specifically generates a control command of turning on the relay 15 corresponding to the port number 4 when the sampled data is "41".

The contents of the sampled data are included in the control commands.

The control unit 113 orders the communication unit 114 to output the control commands generated in step S4, and stores the control commands in the storage unit 115 in step S5. Thus, the control commands are transmitted to the power supply units 11 identified by the unit numbers.

After completing the step S5, the process goes back to step S1.

The above-described process carried out by the control unit 113 is repeated while the power supply device 10 of Embodiment 1 is operated.

Figure 8:
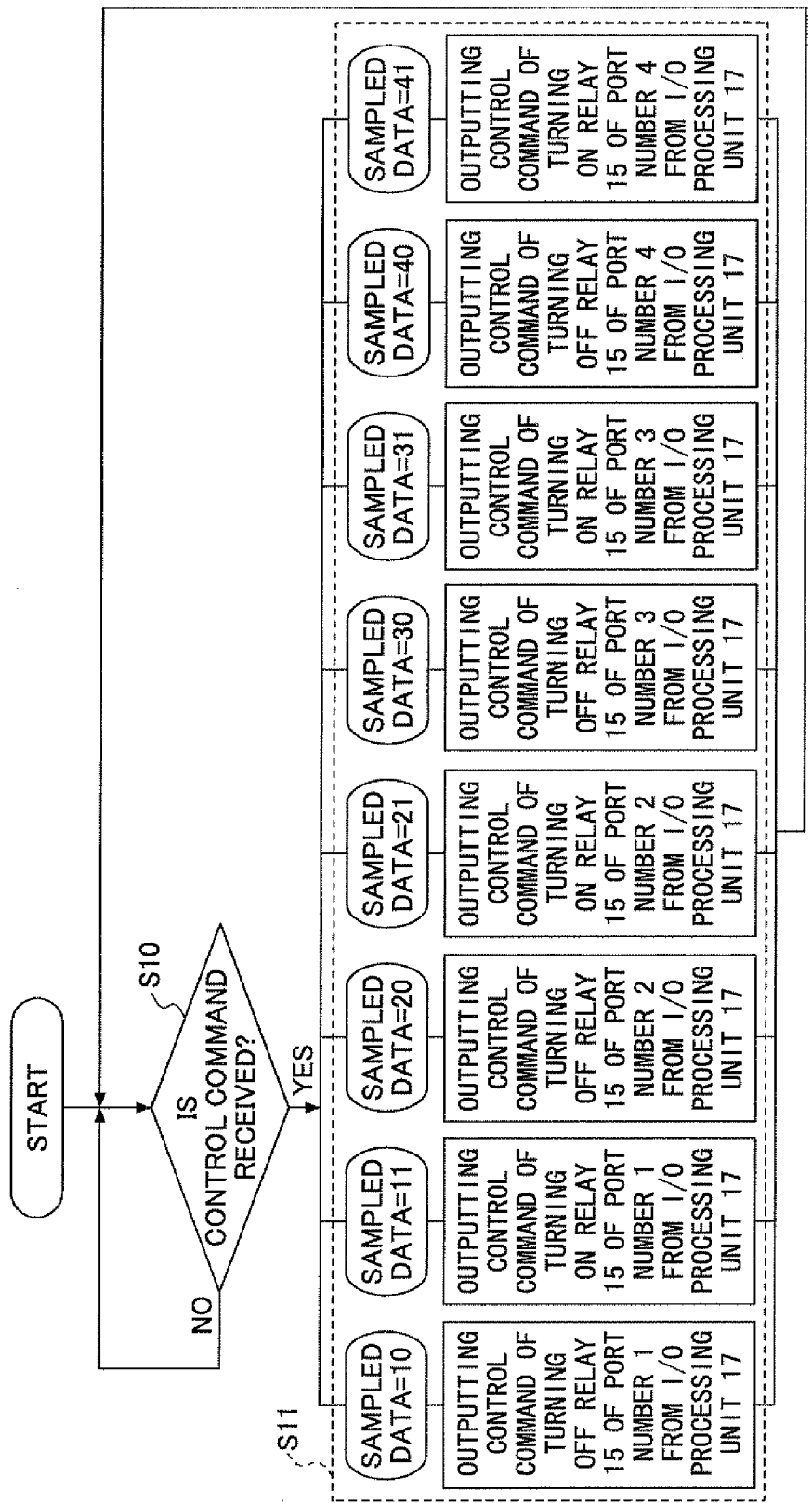
FIG. 8 is a flowchart illustrating a process carried out by the control unit 18 inside the power supply unit of the power supply device of Embodiment 1.

FIG. 8 is a flowchart illustrating a process carried out by the control unit 18 inside the power supply unit 11 of the power supply device 10 of Embodiment 1. This process is carried out by the control unit 18 of the power supply unit 11, and repeated while the power supply unit 11 is operated.

The control unit 18 determines whether the control command is received from the remote controller 100 in step S10. Step S10 is repeated until the control command is received.

When the control command is received via the communication unit 12, the control unit 18 turns on or off the relay 15 corresponding to the port number identified by the control command in response to the sampled data contained in the control command in step S11.

The control unit 18 specifically makes the I/O processing unit turn off the relay 15 corresponding to the port number 1 when the sampled data is "10". The control unit 18 specifically makes the I/O processing unit turn on the relay 15 corresponding to the port number 1 when the sampled data is "11". The control unit 18 specifically makes the I/O processing unit 17 turn off the relay 15 corresponding to the port number 2 when the sampled data is "20". The control unit 18 specifically makes the I/O processing unit turn on the relay 15 corresponding to the port number 2 when the sampled data is "21". The control unit 18 specifically makes the I/O processing unit turn off the relay 15 corresponding to the port number 3 when the sampled data is "30". The control unit 18 specifically makes the I/O processing unit turn on the relay 15 corresponding to the port number 3 when the sampled data is "31". The control unit 18 specifically makes the I/O processing unit turn off the relay 15 corresponding to the port number 4 when the sampled data is "40". The control unit 18 specifically makes the I/O processing unit turn on the relay 15 corresponding to the port number 4 when the sampled data is "41".

As described, the power supply device 10 of Embodiment 1 can turn on or off an arbitrary port 14 of an arbitrary power supply source 11 when an operator operates the remote controller 100.

Since the remote controller 100 is connected to the power supply units $11_1$ to $11_n$ via the hub 5, the communication line 4 and the hub 3 as illustrated in FIG. 2, it is possible to rapidly operate the power supply units $11_1$ to $11_n$ when necessary. The power supply units $11_1$ to $11_n$ can be operated before the PC 6 can be started up.

Further, the remote controller 100 consumes power only when it is operated. Therefore, the power consumption is much lower than that of the PC 6 (illustrated in FIG. 1), and the total power consumption of the power supply device 10 can be drastically reduced.

Figure 1:
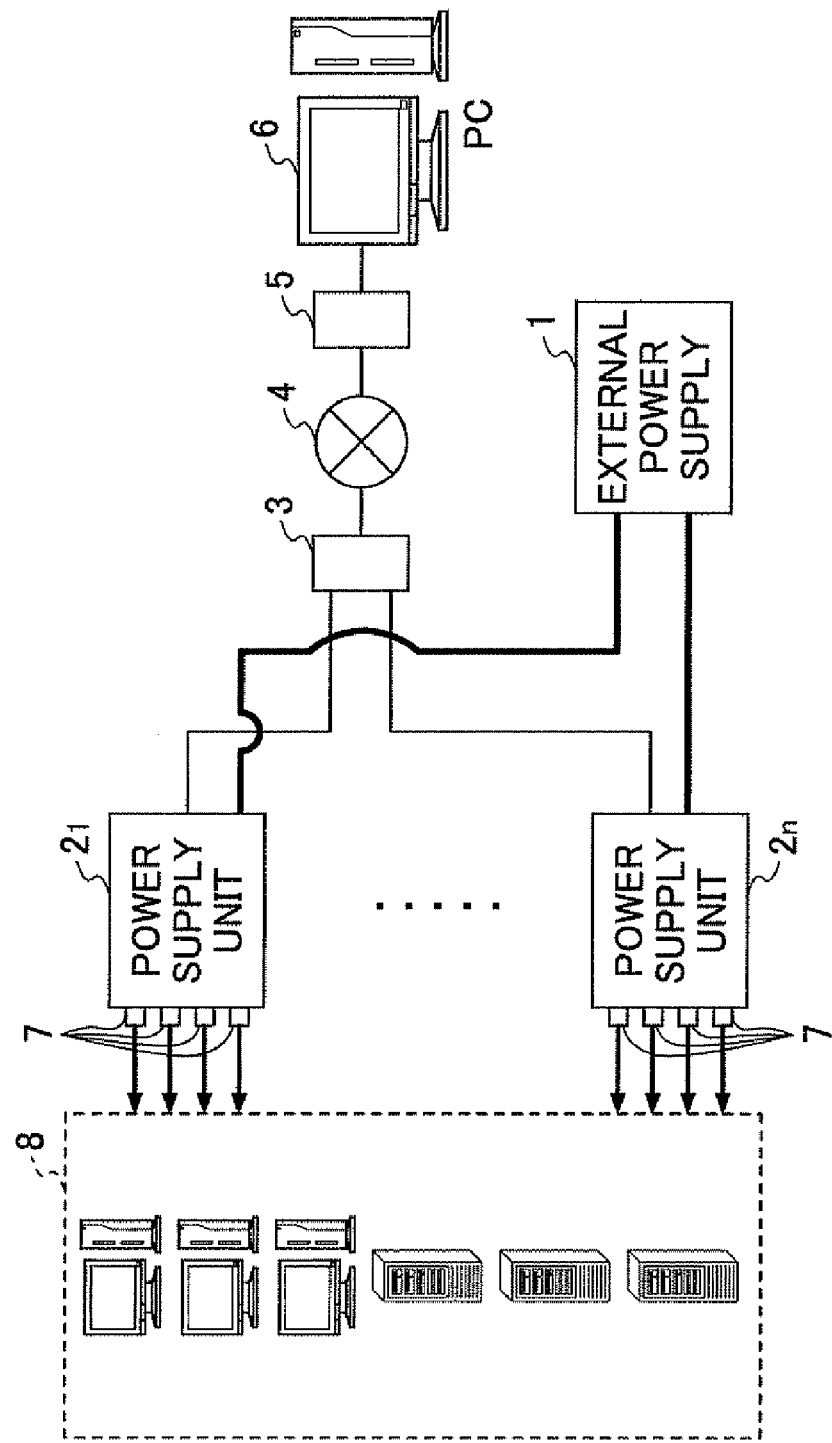
FIG. 1 schematically illustrates an example configuration of a power supply device.

The PC 6 has been used to store data such as the IP addresses to identify the power supply unit, generate an operation command, and send the operation command in the power supply device illustrated in FIG. 1. When the remote controller 100 is used instead of the PC 6, the user does not have to wait during the start-up time to thereby greatly reduce the power consumption during the start-up time or the like.

Further, in the power supply device illustrated in FIG. 1, there is ordinarily a risk such as an unauthorized access to the PC. In order to avoid a security matter, another way of not using the PC is favorable. According to Embodiment 1, since it is possible to operate the power supply unit 11 with the remote controller 100 without using the PC, the security matter caused in remotely controlling the PC does not occur.

Although a mode of connecting the power supply units $11_1$ to $11_n$ to the remote controller 100 via the communication line 4 such as the Internet has been described above, the communication line 4 is not limited to a cable and may be a telephone line, a power line, an optical fiber, a wireless LAN, satellite communications, or the like.

The connections between the power supply units $11_1$ to $11_n$ and the hub 3 and the connection between the hub 5 and the remote controller 100 are not limited to the LAN cable 13A and 13B, and may be a wireless LAN.

In the above description, the remote controller 100 illustrated in FIG. 5A and FIG. 5B is used. However, the remote controller is not limited to this and may be a remote controller illustrated in FIG. 9A and FIG. 9B.

Figure 9A:
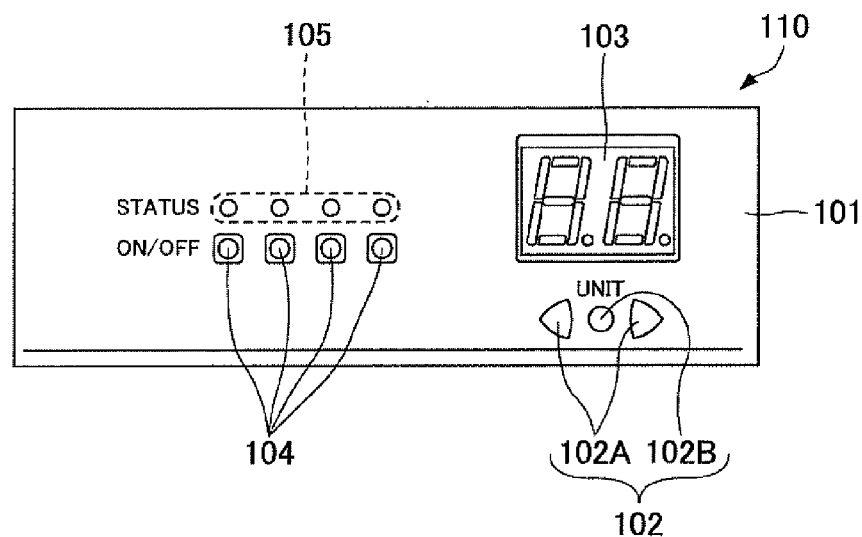
FIG. 9A is a front view of an example remote controller.

FIG. 9A illustrates a simplified remote controller 110. The simplified remote controller 110 includes only a casing 101, a unit selection button 102 (102A, 102B), a display unit 103, a port on/off button 104, and a status indicating lamp 105. The simplified remote controller 110 can operate the power supply units $11_1$ to $11_n$ in a manner similar to the remote controller 100.

Figure 9B:
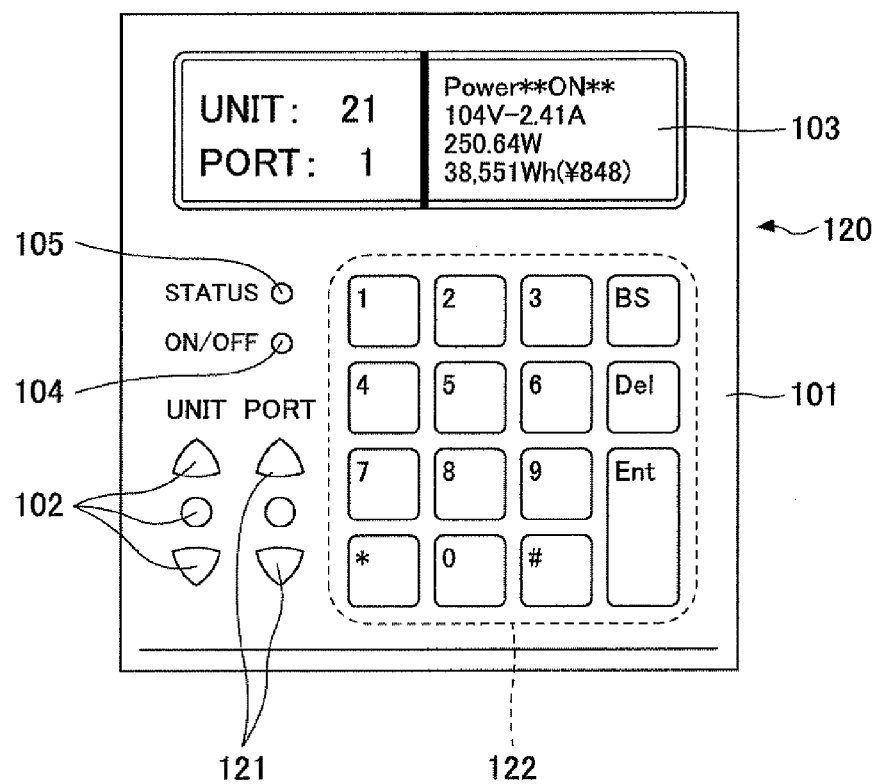
FIG. 9B is a front view of another remote controller.

FIG. 9B illustrates a multifunctional remote controller 120. The multifunctional remote controller 120 includes a larger liquid crystal panel 103 with higher definition, a port selection button 121, and a ten key keypad 122. In the multifunction remote controller 120, it is possible to operate the power supply units $11_1$ to 11 in a manner similar to that in the remote controller 100, and further display the power consumption and the electricity charges on a display unit 103.

Embodiment 2

FIG. 10 schematically illustrates an example configuration of a power supply device 20 of Embodiment 2. The power supply device 20 is different from the power supply device 10 of Embodiments 1 at a point that an infrared remote controller 200 is used. Hereinafter, the same reference symbols are attached to elements the same as those of the power supply device 10, and explanations thereof are omitted. Differences from Embodiment 1 are mainly described next.

The power supply device 20 of Embodiment 2 includes power supply units $21_1$ to $21_n$ and receiving units $22_1$ to $22_n$. The receiving units $22_1$ to $22_n$ are attached to the power supply units $21_1$ to $21_n$. In this, n is an arbitrary integer and represents the unit numbers of the power supply units 21.

The remote controller 200 used for the power supply device 20 of Embodiment 2 is configured to send a control command with infrared communication.

Figure 11:
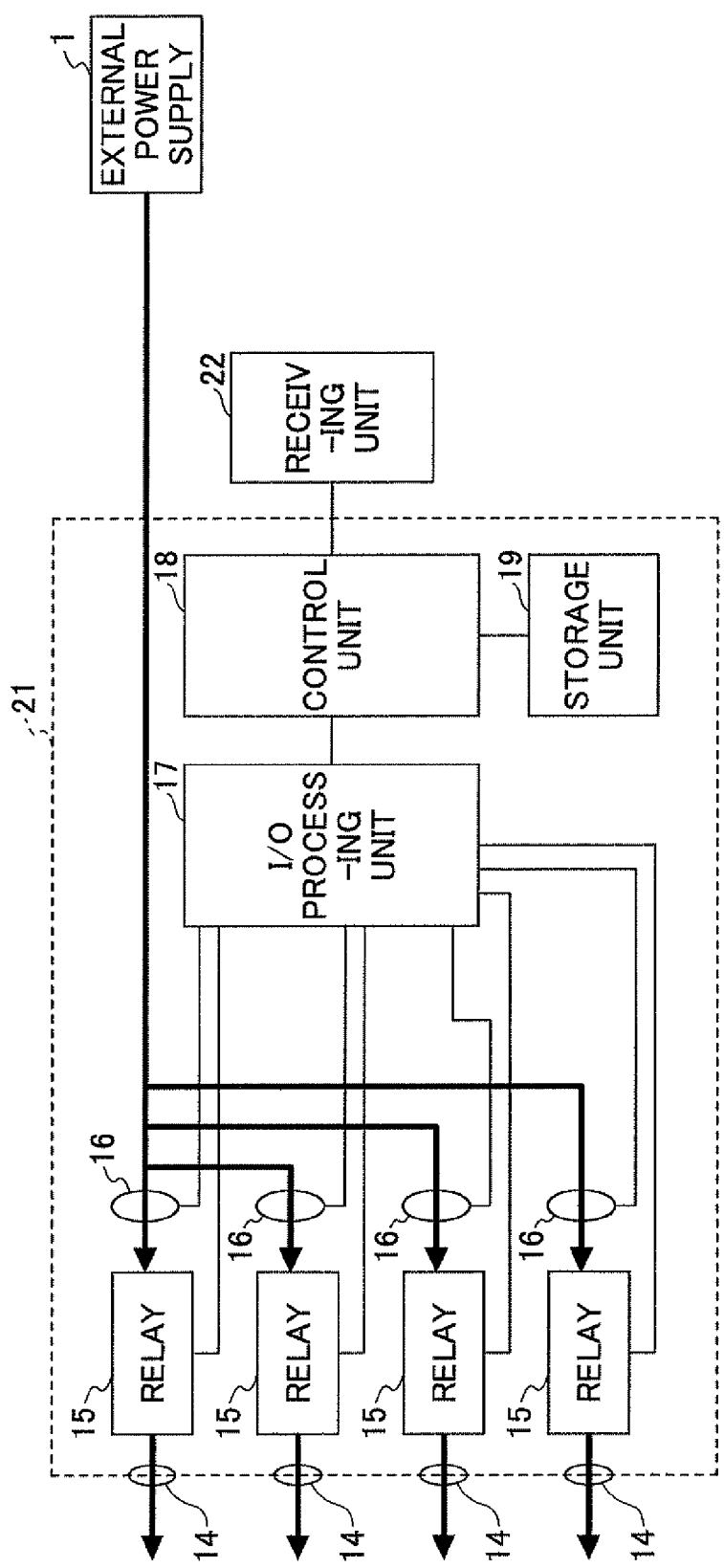
FIG. 11 schematically illustrates an example configuration of a power supply unit of Embodiment 2.

FIG. 11 schematically illustrates an example configuration of a power supply unit 21 of Embodiment 2. In the power supply unit 21 of Embodiment 2, the receiving unit 22 is connected to a control unit 18. The receiving unit 22 demodulates an infrared signal received from the remote controller 200, extracts the control command, and inputs the control command to the control unit 18. The control unit 18 turns on or off relays 15 with sampled data contained in the received control command in a manner similar to that in the control unit 18 of Embodiment 1.

Figure 12A:
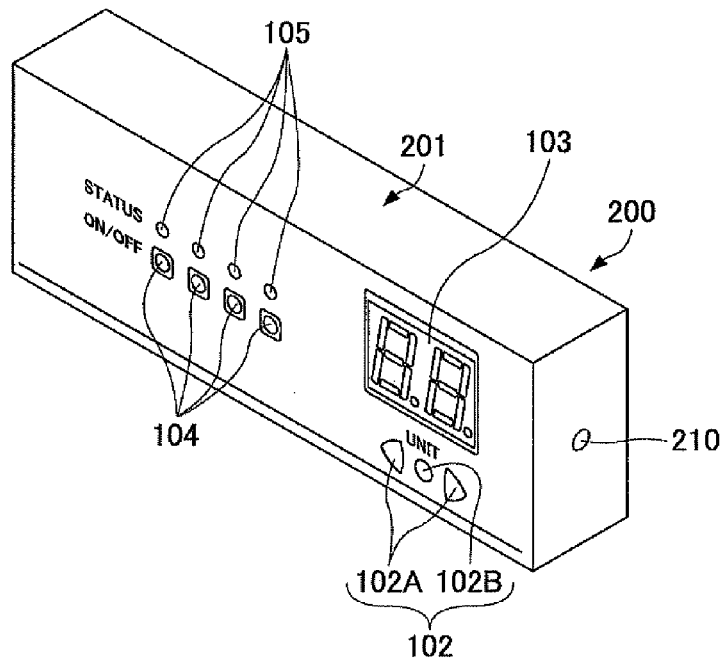
FIG. 12A is a perspective view of a remote controller used for the power supply device of Embodiment 2.
Figure 12B:
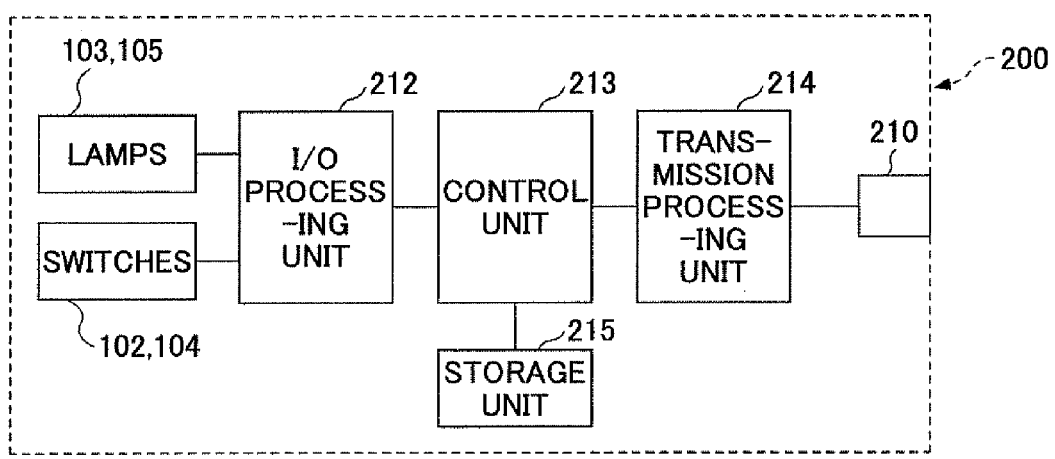
FIG. 12B is a block diagram illustrating an inner configuration of the remote controller used in the power supply device of Embodiment 2.

FIG. 12A is a perspective view of the remote controller 200 used for the power supply device of Embodiment 2. FIG. 12B is a block diagram illustrating an inner configuration of the remote controller 200 used in the power supply device 20 of Embodiment 2.

Referring to FIG. 12A, the remote controller 200 includes a casing 201, a unit selection button 102 (102A,102B), a display unit 103, a port on/off button 104, a status indicating lamp 105, and an infrared transmitter 210.

Referring to FIG. 12B, the remote controller 200 further includes an I/O processing unit 212, a control unit 213, a transmission processing unit 214, a storage unit 215, lamps 103 and 105, and switches 102 and 104.

The I/O processing unit 212 carries out a process of lighting the lamps and inputting a signal indicative of input operations applied to the switches to the control unit 213. The lamps are the display unit 103 and the status indicating lamp 105. The switches are the unit selection button 102 (102A, 102B) and the port on/off button 104.

The control unit 213 generates and outputs control commands in response to the input operations applied to the switches and lights the lamps in response to the input operations. A CPU may constitute the control unit 213.

The transmission processing unit 214 superposes a signal indicative of the control command generated by the control unit 213 on a carrier wave, modulates the superposed signal and the carrier wave, and inputs the modulated signal to the infrared transmitter 210.

A storage unit 215 may be a nonvolatile memory for storing data indicative of unit numbers of the power supply units $21_1$ to $21_n$ and port numbers of the ports 14.

The infrared transmitter 210 transmits an infrared signal input from the transmission processing unit 214 to an outside of the remote controller 200.

The remote controller 200 superposes control signals indicative of the unit numbers and the port numbers which are input to the unit selection button 102 (102A, 102B) and the port on/off button 104 and turning-on or turning-off of the ports 14 (i.e. turning-on or turning-off of the relays 15 connected to the ports 14) on the carrier wave, and transmits the superposed signal and the carrier wave as the infrared signal from the infrared transmitter 210 to the power supply units 21.

The power supply unit 21 which has received the infrared ray signal from the remote controller 200 turns on or off the relays 15 based on the sampled data acquired by demodulating the infrared ray.

As described, the power supply device 20 of Embodiment 2 can turn on or off an arbitrary port 14 of an arbitrary power supply source 21 when an operator operates the remote controller 200.

The remote controller 200 can rapidly and always operate the power supply units 21 since the start-up time does not exist in the remote controller 200, unlike the PC 6 of the power supply device illustrated in FIG. 1.

Further, the remote controller 200 consumes power only when it is operated. Therefore, the power consumption is much lower than that of the PC (illustrated in FIG. 1), and the total power consumption of the power supply device 20 can be drastically reduced.

Further, in addition to the operation with the PC 6 for remote control illustrated in FIG. 1, there is a case where the PC 6 is directly connected to the power supply units 2 illustrated in FIG. 1 and the relays are controlled to be turned on or off. When the PC 6 for remote control illustrated in FIG. 1 is not movable, another PC needs to be to directly connected with the power supply unit 2. In this case, operability is insufficient.

The infrared remote controller 200 of Embodiment 2 may be combined with the remote controller 100. In case of the remote control, the infrared remote controller 200 as the remote controller 100 is connected to the power supply units 21 via the LAN cables 13A and 13B. In case of the direct control, the remote controller 200 is detached from the LAN cables 13A and 13B and the power supply units 11 are directly controlled by infrared communication. Therefore, the operability is improved.

Figure 13:
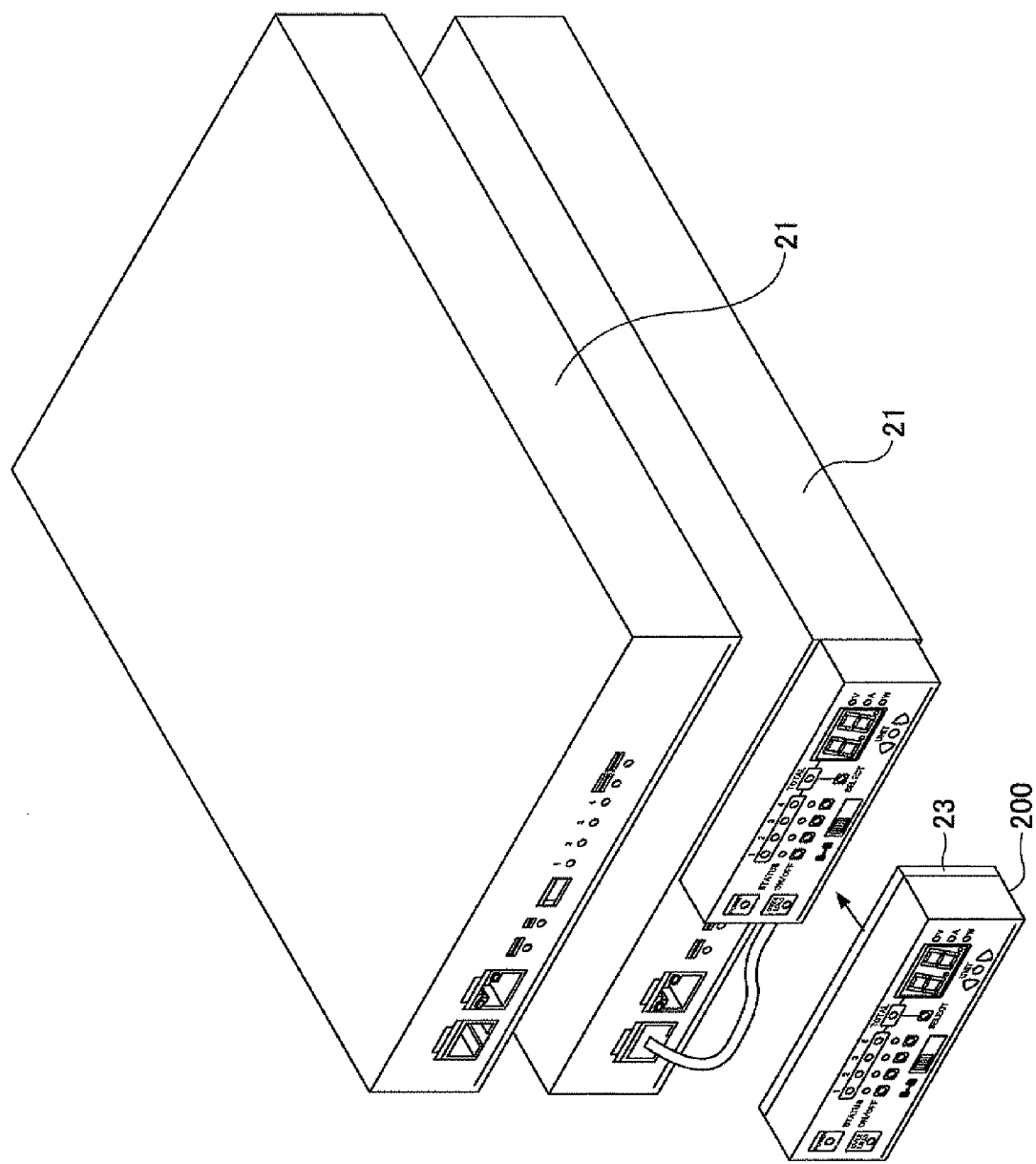
FIG. 13 is a perspective view of the power supply unit and the remote controller of Embodiment 2 attached to the power supply unit by a magnet.

FIG. 13 is a perspective view of the power supply unit 21 and the remote controller 200 of Embodiment 2 attached to the power supply unit 21 by a magnet.

When the casing of the power supply unit 21 is made of a material like iron which a magnet attracts, by attaching a sheet-like magnet 23 to a back side of the casing of the remote controller 200, the remote controller 200 attracts the power supply unit 21 with magnetic force.

Although there has been described about the power supply device 20 for transmitting the control command from the remote controller 200 to the receiving unit 22 of the power supply unit 21 with infrared communication in Embodiment 2, a wireless LAN may be used to transmit an IP address from the remote controller 200 to the power supply unit 21.

Embodiment 3

Next, a power supply device and a remote controller used for a power supply device of Embodiment 3 is described.

Referring to FIG. 2, a power supply device 30 of Embodiment 3 having a configuration substantially the same as that of Embodiment 1 is described.

The power supply device 30 of Embodiment 3 includes power supply units $31_1$ to $31_n$ and communication units $32_1$ to $32_n$ as a mode of a receiving unit. The communication units $32_1$ to $32_n$ are installed inside the corresponding power supply units $31_1$ to $31_n$. In this, n is an arbitrary integer and represents unit numbers of the power supply units 31.

Hereinafter, when the power supply units $31_1$ to $31_n$ are not discriminated, the power supply units are representatively or collectively referred to as a power supply unit 31 or power supply units 31. In a similar manner, when the communication units $32_1$ to $32_n$ are not discriminated, the communication units are representatively or collectively referred to as a communication unit 32 or communication units 32. Although plural power supply units 31 and communication units 32 are illustrated in FIG. 2, the numbers of the power supply units 31 and the communication units 32 may be at least one. The communication units $32_1$ to $32_n$ may be installed inside or outside the power supply units $31_1$ to $31_n$.

The power supply units $32_1$ to $32_n$ include plural ports 34 which distribute power supplied from an external power supply 1. Electronic apparatuses 8 such as a PC, a server and a monitor are connected to the ports 34. The power supply units $31_1$ to $31_n$ switch supply or non-supply of power supplied from the external power supply 1 to the electronic apparatuses 8. The number of the ports 34 is not limited to four and may be at least one.

The communication units $32_1$ to $32_n$ are connected to a remote controller 300 via LAN cables 13A, hubs 3 and 5, a communication line 4 such as the Internet, and a LAN cable 13B. The communication units $32_1$ to $32_n$ function as interfaces which receive control commands for controlling switching of the power supply units $31_1$ to $31_n$ from the remote controller 300. An example internal configuration of the power supply unit 31 of Embodiment 3 is described below in reference to FIG. 14.

The remote controller 300 transmits an order command to the power supply device 30 of Embodiment 3. Detailed explanation of the remote controller 300 is given in reference to FIG. 15 later.

Figure 14:
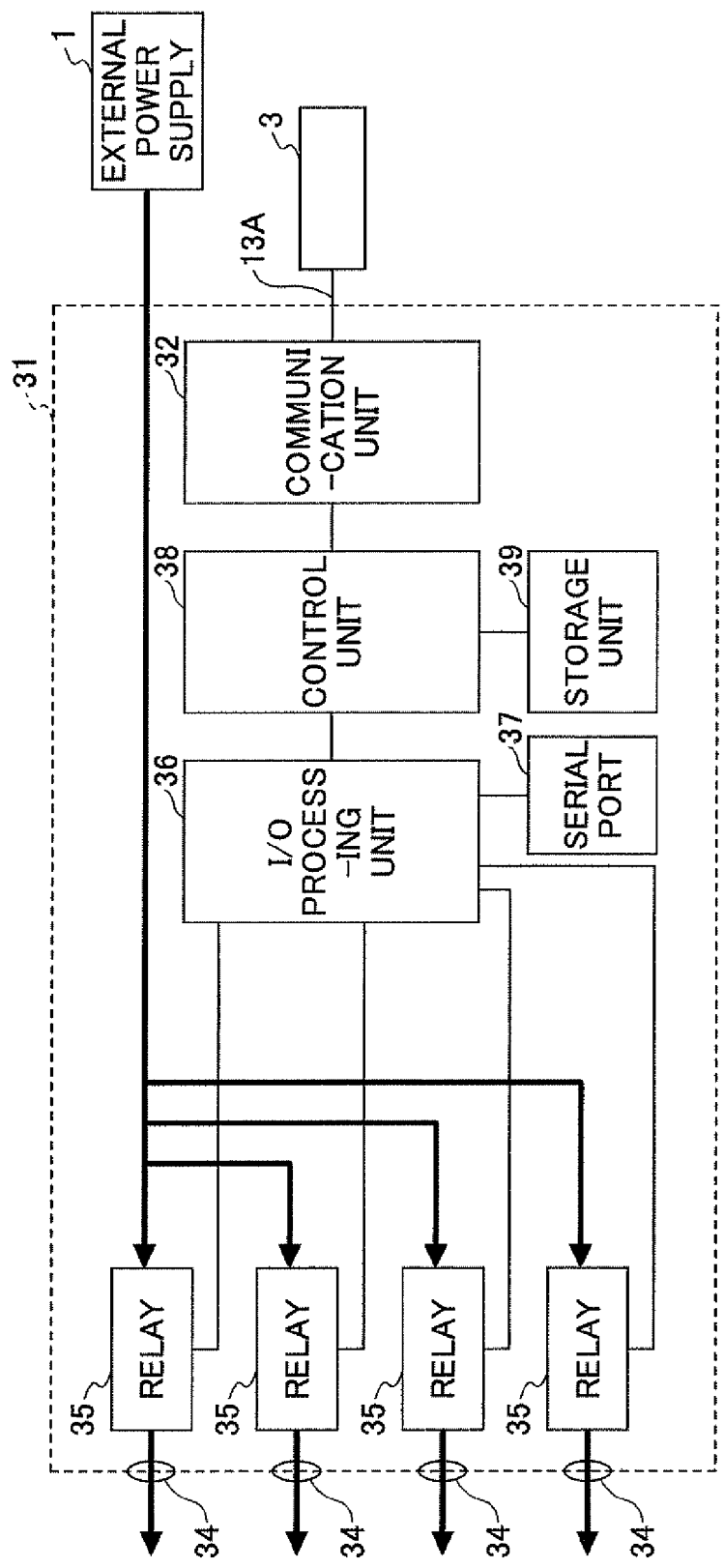
FIG. 14 schematically illustrates an example configuration of a power supply unit of Embodiment 3.

FIG. 14 schematically illustrates an example configuration of the power supply unit 31 of Embodiment 3. Referring to FIG. 14, the respective power supply units 31 include four relays 35 connected to the external power source 1. The ports 34 are connected to the output sides of the relays 35. The power supply unit 31 includes a communication unit 32, the ports 34, the relays 35, an I/O processing unit 36, a serial port 37, a control unit 38, and a storage unit 39.

The I/O processing unit 36 turns on or off the relays 35 based on an order command input from the control unit 38.

The serial port 37 is provided to connect the remote controller 300 to the power supply unit 31 for transmitting an IP address and a MAC address to the remote controller 300 and registering the order of the power supply units 31 into the remote controller 300. The remote controller 300 is connected to the power supply unit 31 via a cable for serial communication such as RS232C.

The control unit 38 mainly carries out a control process for driving the power supply unit 31. A central processing unit (CPU) may constitute the control unit 38. The control unit 38 transmits at least a power-on command in order to supply power to the power supply units 31 corresponding to the order command based on the order command input from the remote controller 300 via the communication unit 32.

A CPU may constitute the control unit 38, the communication unit 32 and the I/O processing unit 36.

The storage unit 39 stores data for driving the power supply unit 31. A nonvolatile memory may constitute the storage unit 39. The storage unit 39 stores at least Internet Protocol (IP) addresses for identifying the power supply units $32_1$ to $32_n$, Media Access Control (MAC) addresses, and an order command indicative of an order of connecting the four relays 35.

Figure 15A:
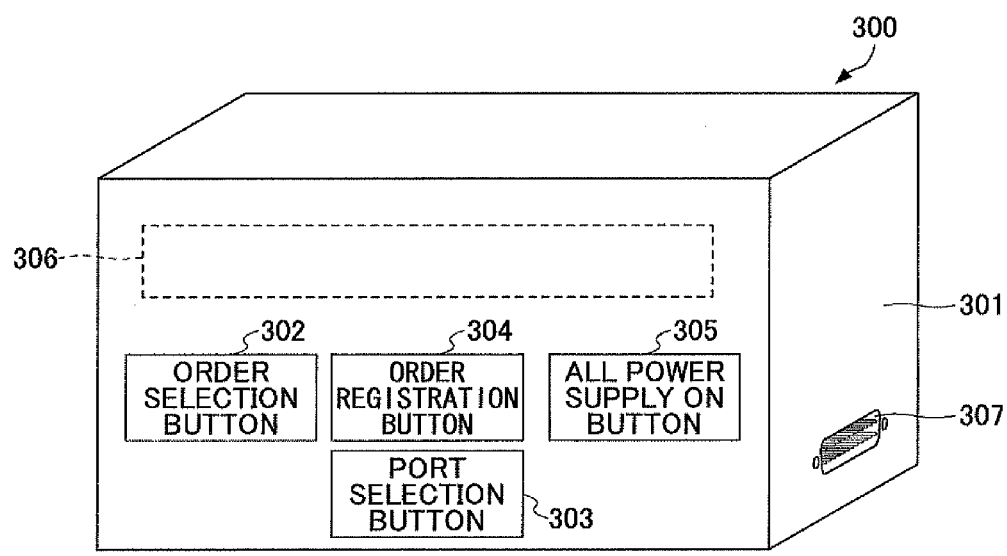
FIG. 15A is a perspective view of a remote controller used for the power supply device of Embodiment 3.

FIG. 15A is a perspective view of the remote controller 300 used for the power supply device 30 of Embodiment 3. FIG. 153 is a block diagram illustrating an inner configuration of the remote controller 300 used in the power supply device 30 of Embodiment 3.

Referring to FIG. 15A, the remote controller 300 includes a casing 301, an order registration button 304, an all power supply ON button 305, a liquid crystal display part 306 and a serial port 37.

The casing 301 may have a plastic rectangular solid-like body having a cavity in it. The order selection button 302, the port selection button 303, the order registration button 304, the all power supply ON button 305, the liquid crystal display part 306, and the serial port 37 are exposed on the outside of the casing.

The order selection button 302 is used to register an order of supplying power to the power supply units 31 while selecting the power supply units 31 in this order.

The port selection button 303 is pushed by an operator for selecting the port numbers of the ports 34. Every pushing of the port selection button 303 sequentially switches the port numbers 1 to 4.

The registration button 304 is pushed by the operator to register the order selected by the order selection button 302, or the port 34 selected by the port selection button 303. The order selected by the order selection button 302 is confirmed when the order registration button 304 is pushed.

The all power supply ON button 305 is provided to be pushed by the operator when an order command is transmitted to the power supply unit 31 from the remote controller 300.

The liquid crystal display part 306 is provided to display the order, the IP address, the MAC address, and the port number or the like of the power supply units 31.

The serial port 37 is provided to connect the remote controller 300 to the power supply unit 31 for transmitting an IP address and a MAC address to the remote controller 300 and registering the order of the power supply units 31 into the remote controller 300.

Figure 15B:
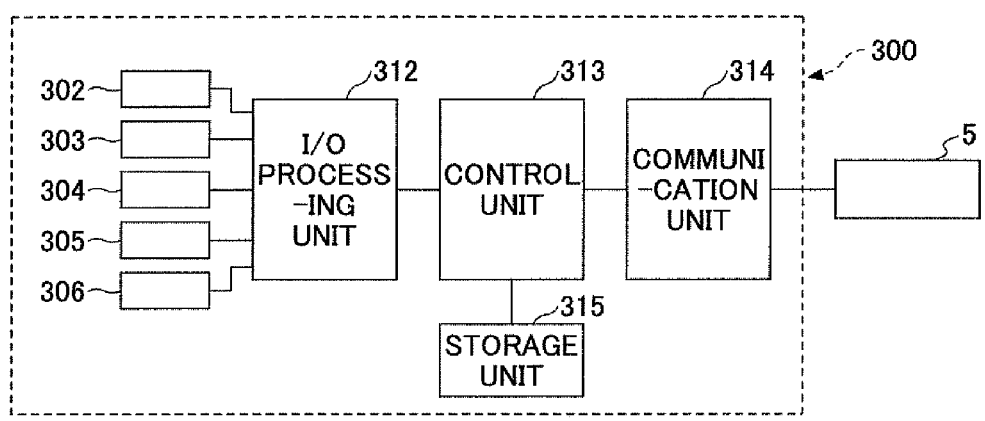
FIG. 15B is a block diagram illustrating an inner configuration of the remote controller used in the power supply device of Embodiment 3.

Referring to FIG. 15B, the remote controller 300 includes an I/O processing unit 312, a control unit 313, a communication unit 314, and a storage unit 315.

In a case where at least the order registration button 304 and the all power supply ON button 305 are pushed, the I/O processing unit 312 carries out inputting of a command indicative of pushing to the control unit 313, displaying on the liquid crystal display part 306 when the command indicative of a display content is transmitted from the control unit 313, and inputting to the control unit 313 when the IP address and the MAC address are input from the serial port 37.

The control unit 313 carries out generation and output of commands corresponding to the input operations through the order registration button 304 and the all power supply ON button 305, generation of display content to be displayed on the liquid crystal display part 306, and storage of the IP addresses and the MAC addresses input from the serial port 37 into the storage unit 315. A CPU may constitute the control unit 313.

The communication unit 314 functions as an interface for transferring the order commands generated by the control unit 313 to the power supply unit 31 via the hub 5, the communication line 4 and the hub 3.

The storage unit 315 may be a memory for storing the data indicative of the IP addresses, the MAC addresses, and the port numbers of the power supply units $31_1$ to $31_n$. The storage unit 315 may be a nonvolatile memory.

A CPU may constitute the I/O processing unit 312, the control unit 313 and the communication unit 314.

FIG. 16 is a table schematically illustrating data stored in the storage unit 315 of the remote controller 300 of Embodiment 3. As an example, the IP addresses, the MAC addresses, and the port numbers of the power supply devices $31_1$, $31_k$ and $31_n$ are illustrated in FIG. 16. In this, k is an integer satisfying 1<k<n.

The IP addresses and the MAC addresses of the power supply units $31_1$ to $31_n$ are allocated to the corresponding power supply units $31_1$ to $31_n$. Therefore, the storage unit 315 of the remote controller 300 stores the IP addresses, the MAC addresses and the port numbers that are mutually associated and arranged in the order of supplying the power as the database.

The IP addresses and the MAC addresses are used for identifying one power supply unit out of the power supply units $31_1$ to $31_n$. The data indicative of the port numbers are used to control turning-on or turning-off of the four ports 34 of the power supply unit 31.

The data indicative of the IP addresses, the MAC addresses, and the port numbers relate to and represent the order command. The data indicative of the port number relate to and represent a terminal order command. The terminal order command is contained in the order command.

Figure 17:
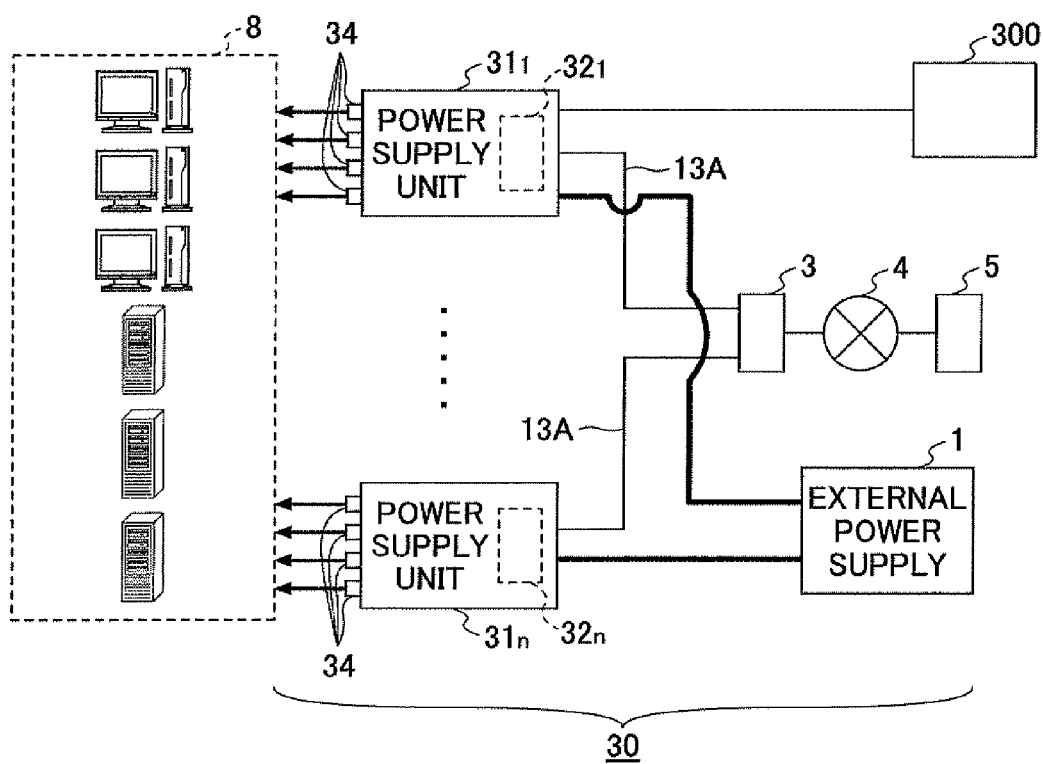
FIG. 17 schematically illustrates an example configuration of the power supply device of Embodiment 3.

FIG. 17 schematically illustrates an example configuration of the power supply unit 31 connected to the remote controller 300 of Embodiment 3. Referring to FIG. 17, the remote controller 300 acquires the IP addresses and the MAC addresses of the power supply devices $31_1$ while the remote controller 300 is connected to the power supply devices $31_1$. The serial port 307 (see FIG. 155) of the remote controller 300 and the serial port 37 (see FIG. 14) of the power supply devices $31_1$ may be connected by a serial communication cable such as RS232C.

The remote controller 300 acquires the IP addresses and the MAC addresses of the power supply devices 31 while the remote controller 300 is connected to the power supply unit 31, the order of supplying power of which is to be registered, among the power supply units $31_1$ to $31_n$. The IP addresses and the MAC addresses are arranged and registered in the order of supplying power in the remote controller 300. The order of the ports 34 is registered in addition to the order of the power supply units 31. By registering these ports and addresses, the data illustrated in FIG. 16 are obtainable.

Figure 18:
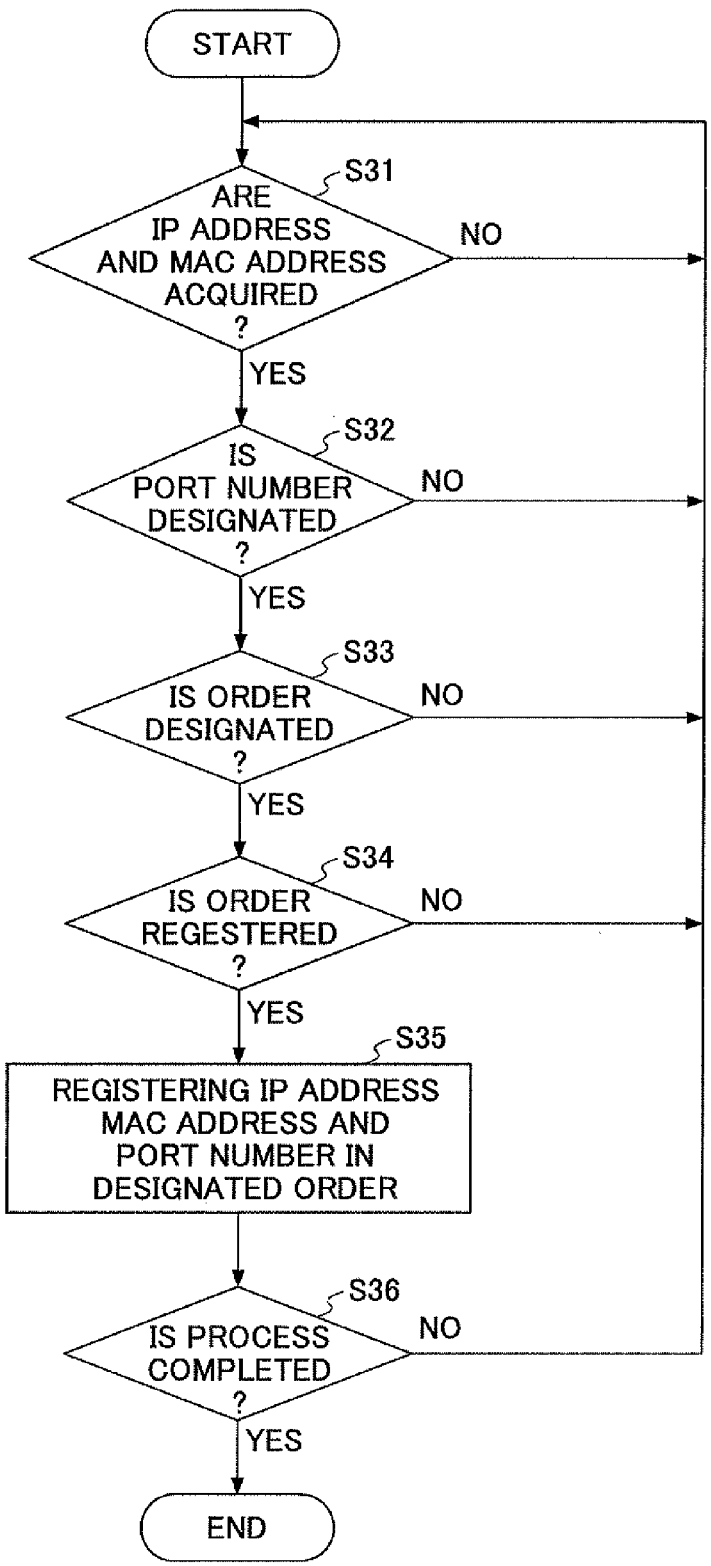
FIG. 18 is a flowchart illustrating a process of registering an order of supplying power inside the remote controller used for the power supply device of Embodiment 3.

FIG. 18 is a flowchart illustrating a process of registering the order of supplying power inside the remote controller 300 used for the power supply device 30 of Embodiment 3. The process is carried out by the control unit 313 of the remote controller 300.

When the remote controller 300 is connected to the power supply units 31, the process starts.

In step S31, the control unit 313 determines whether the IP addresses and the MAC addresses are acquired from the power supply units 31. Step S31 is repeated until the IP addresses and the MAC addresses are acquired.

In step S32, the control unit 313 determines whether the port selection button is pushed and the port number is designated when the IP addresses and the MAC addresses are acquired from the power supply unit 31.

The control unit 313 determines whether an order of selecting the ports 34 is selected in step S33. The selection of the order is carried out when the order selection button 303 illustrated in FIG. 15A is pushed.

In step S34, when the order is selected, the control unit 313 determines whether the order registration button 304 is pushed, and the order is confirmed.

In step S35, when the order is confirmed, the control unit 313 stores the IP addresses, the MAC addresses, and the port numbers in association with the order of selecting the ports in the storage unit 315.

In step S36, after the control unit 313 stores the IP addresses, the MAC addresses, and the port numbers in association with the order of selecting the ports in the storage unit 315, the control unit 313 determines whether another port 34 is to be registered.

If the control unit 313 does not register the other ports 34 and determines the completion of the process, the process of steps S31 to 536 ends.

When the control unit 313 selects NO in steps S31 to S34 and S36, the process returns to step S31.

As described, the process with the control unit 313 ends, and the database illustrated in FIG. 16 is formed.

The process in a case where the power is supplied based on the order command transmitted to the power supply unit 31 from the remote controller 300 is described next.

Figure 19:
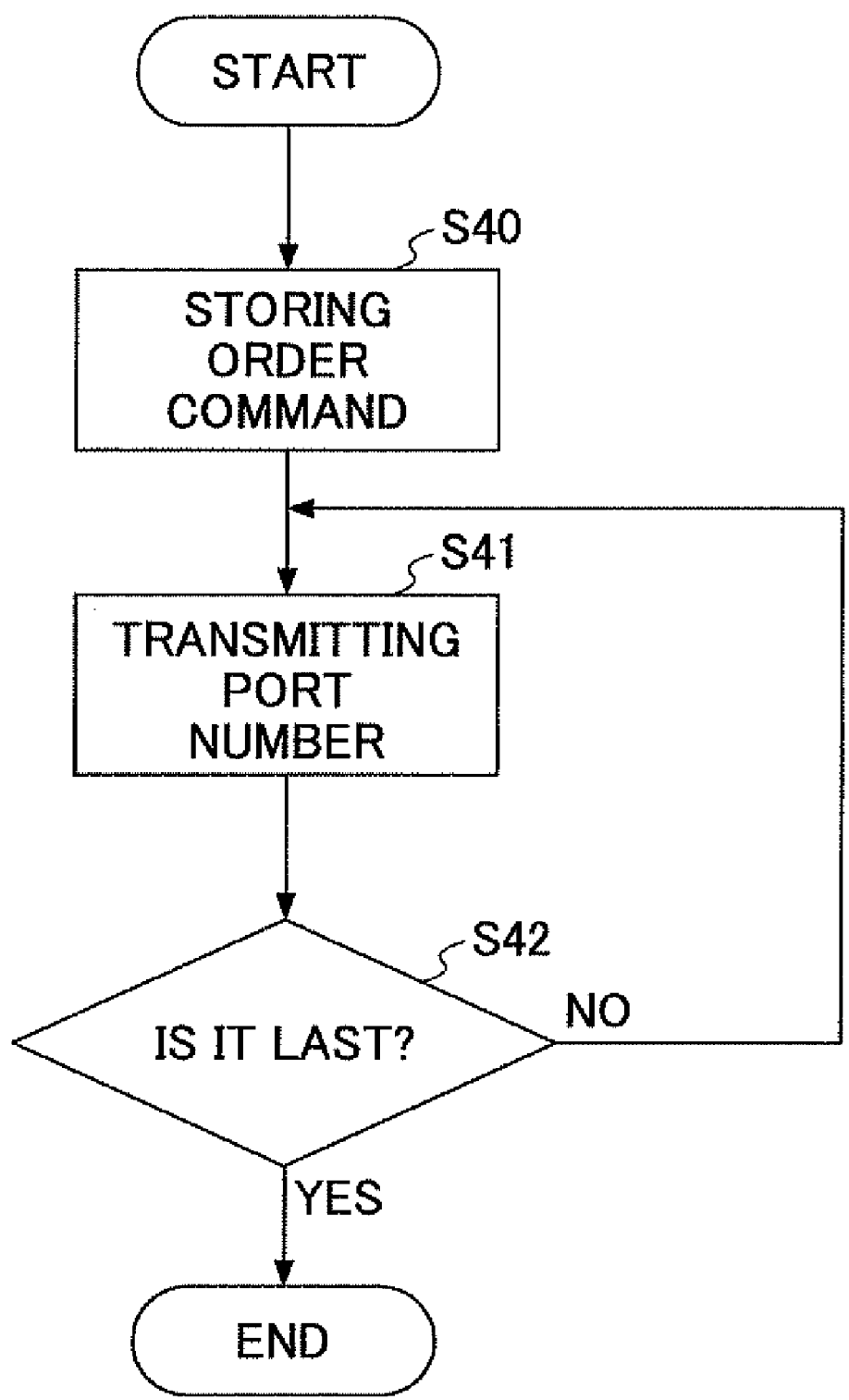
FIG. 19 is a flowchart illustrating a process of the power-on based on an order command received by the power supply unit.

FIG. 19 is a flowchart illustrating a process of the power-on based on the order command received by the power supply unit 31.

The remote controller 300 is connected to the hub 5 as illustrated in FIG. 2. The order command is transmitted to the power supply unit 31. A control unit 38 of the power supply unit 31 carries out the process illustrated in FIG. 19.

In step S40, after the control unit 38 receives the order command, the control unit stores the order command in the storage unit 39.

In step S41, the control unit 38 sequentially reads out the order command stored in the storage unit 39, and transmits data indicative of the port number to one of the power supply units $31_1$ to $31_n$ identified by the IP address and the MAC address. When the power supply unit 31 is identified, the control unit 38 turns on the relay 35 corresponding to the port number indicated by the transmitted data.

In step S42, the control unit 38 confirms whether there are the data of the next order. If there are the next data, the control unit repeats step S41. If there are not any next data, the control unit 38 completes the process. Thus, the process ends.

In steps S40 to S42, the data indicative of the port numbers are transmitted to one or more of the power supply unit $31_1$ to $31_n$ in the order registered in the database illustrated in FIG. 16 generated in the remote controller 300.

Figure 20:
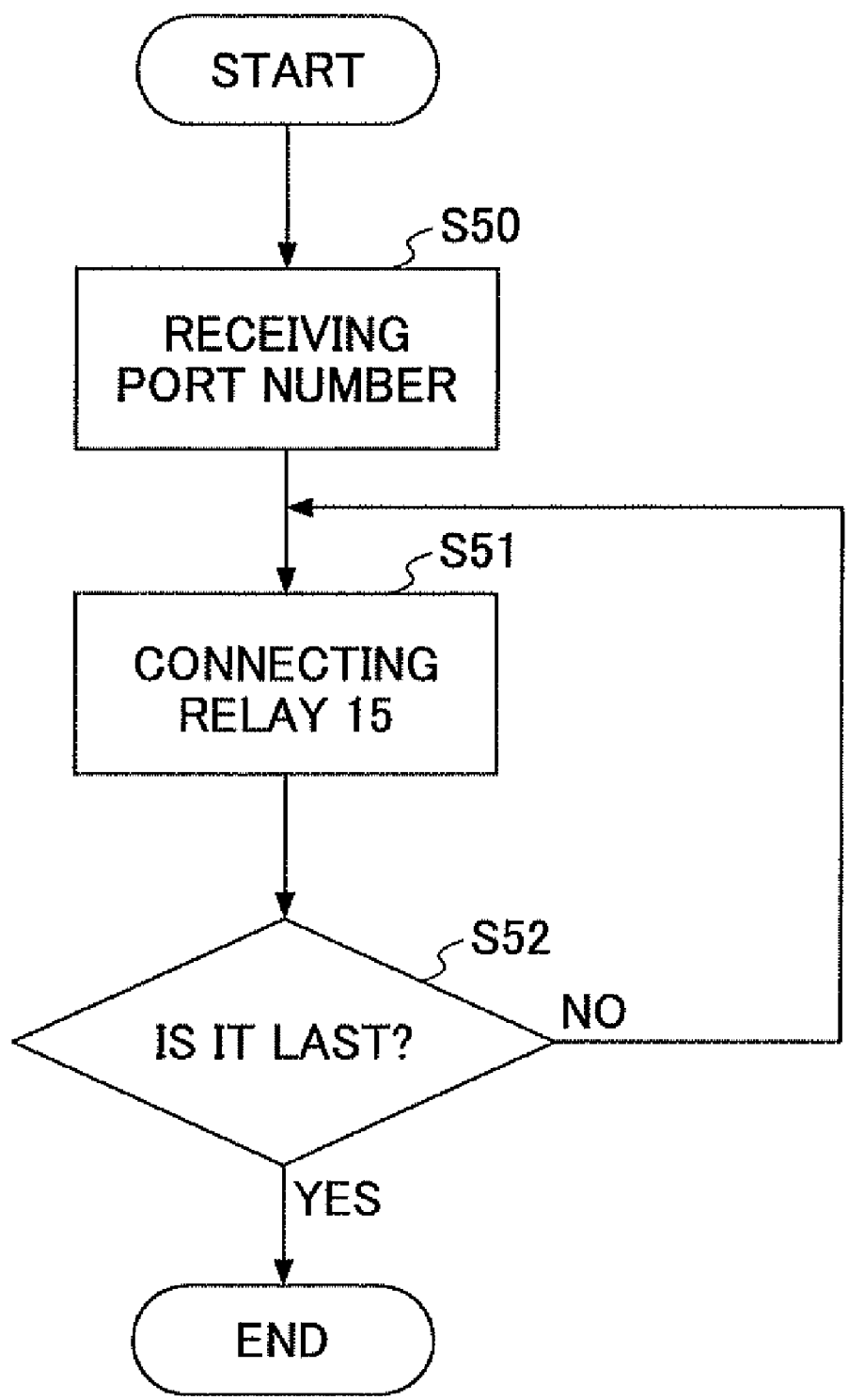
FIG. 20 is a flowchart illustrating a process of the power-on after the power supply unit receives a port number.

FIG. 20 is a flowchart illustrating a process of supplying power carried out by the power supply unit 31 after the power supply unit 31 receives the port number. The process is carried out by the control unit 38 inside the power supply unit 31 which has received the port number.

When the control unit 38 receives the port number in step S50, the control unit 38 connects the relay 35 corresponding to the port 34 indicated by the port number in step S51.

In step S52, the control unit 38 determines whether the last port number in the transmitted data is processed. If the final port number is processed, the process ends. If not, the process returns to step S51.

As described, the power is sequentially supplied from the four ports included in the power supply unit 31.

As described, the power supply device 30 of Embodiment 3 can easily register the order of supplying the power from the power supply unit 31 using the remote controller 300 in accordance with the process illustrated in FIG. 18. Further, by registering the order of supplying the power in the power supply unit 31, it is possible to generate the database (see FIG. 16) for producing the order command.

The power supply device 30 of Embodiment 3 can supply the power from the ports 34 of the power supply units $31_1$ to $31_n$ to the electronic apparatuses (see FIG. 2) in the order registered in the database (see FIG. 16) by the process illustrated in FIG. 19 and FIG. 20.

Therefore, the power supply units $31_1$ to $31_n$ do not simultaneously start to supply power, and timings of starting to supply the power from the ports 34 inside the power supply units $31_1$ to $31_n$ can be shifted. Therefore, it is possible to provide the power supply device which can stably supply power without generating a rush current.

Thus, it becomes possible to easily set the timings of starting to supply the power to the power supply units $31_1$ to $31_n$ by connecting the remote controller 300 to the power supply units $31_1$ to $31_n$. Further, at this time, the order of supplying the power from the ports 34 of the power supply units $31_1$ to $31_n$ can be set. Therefore, the power can be supplied more stably.

Although the mode of registering the order of supplying the power from the port 34 in addition to the order of the power supply units $31_1$ to $31_n$ has been described, the order of supplying the power from the ports 34 may not be always registered. The power may be simultaneously started to be supplied from one or more of the ports 34, or the power may be supplied from the ports 34 in a predetermined order.

Although there has been described the mode of transmitting the order command via the communication line 4 such as the Internet while the remote controller 300 is connected to the LAN cable 13B, the order command may be transmitted from the remote controller 300 to the power supply units 31 while the serial port 307 (see FIG. 15A and FIG. 15B) of the remote controller 300 is connected to the serial port 37 (see FIG. 14) of the power supply unit 31 via a cable for serial communication.

The power supply device 30 of Embodiment 3 can set the order of supplying the power without using the PC and can start to supply the power at any time without waiting through the start-up time as required in the power supply device using the PC 6 illustrated in FIG. 1.

The power supply device 10 of Embodiment 3 may include a PC in a similar manner to that in the power supply device using the PC 6 illustrated in FIG. 1. In this case, the remote controller 300 may be connected to the PC, the database indicative of the order command may be stored in a memory of the PC, and the PC may carry out power supply sequentially in the above-described order.

Although the mode of identifying the power supply unit 31 using both of the IP address and the MAC address has been described, if it is possible to identify using only one of the IP address and the MAC address, it is possible to use only one of the IP address and the MAC address.

Although there has been described the power supply device 30 which transmits the order command from the remote controller 300 connected to the LAN cable 13B, it is also possible to transmit the order command between the power supply units 31 and the remote controller 300 via a wireless LAN instead of the LAN cable 13B.

Further, instead of the wireless LAN, infrared communication may be used to transmit the order command between the remote controller 300 and the power supply units 31.

According to Embodiments 1 to 3, it is possible to provide the power supply devices which can immediately control power supply when necessary and a remote controller used for the power supply device.

It is further possible to provide the power supply device which can control a timing of starting to supply power and the remote controller used for the power supply device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power supply system comprising:
a power supply device provided between an external power source and electronic apparatuses, the power supply device including
power supply units, each of which is connected to a corresponding electronic apparatus and is configured to switch power supply from the external power source to the corresponding electronic apparatus, and
receiving units, each of which corresponds to one of the power supply units and is configured to receive a control command for controlling the corresponding power supply unit; and
a remote controller connected to the power supply device, and is configured to control the power supply device by transmitting the control command, the remote controller including
a control unit that generates the control command for controlling each of the power supply units to start the power supply,
a communication unit that outputs the control command to the receiving units, and
a storage unit configured to store identification information of each of the power supply units being acquired from the power supply units.

2. The power supply system according to claim 1, wherein each of the receiving units is attachable to a corresponding power supply unit.

3. The power supply system according to claim 1, wherein the receiving units are connectable to the remote controller via a communication line.

4. The power supply system according to claim 1, wherein the power supply units includes
relays connecting the external power source to the electronic apparatuses,
an I/O processing unit configured to control the supply of the power to the electronic apparatuses,
wherein the control command includes an order command indicative of an order of supplying the power to the electronic apparatuses, and
the I/O processing unit controls the supply of the power in response to the order command.

5. The power supply system according to claim 4,
wherein the order command identifies the power supply units using IP addresses, MAC addresses, or the IP addresses and the MAC addresses of the power supply units.

6. The power supply system according to claim 4,
wherein the power supply units include ports for connecting the electronic apparatuses to the relays, respectively,
the order command includes a port order command indicating an order of supplying the power from the ports, and
the power supply units switch the power supply to the electronic apparatuses via the ports in response to the port order command received by the corresponding receiving units.

7. A power supply system comprising:
a power supply device provided between an external power source and electronic apparatuses, the power supply device including
  power supply units, each of which is connected to a corresponding electronic apparatus and is configured to switch a power supply from the external power source to the corresponding electronic apparatus, and
  receiving units, each of which corresponds to one of the power supply units and is configured to receive a control command for controlling the corresponding power supply unit; and
a remote controller connected to the power supply device, and is configured to control the power supply device by transmitting the control command, the remote controller including
  a control unit that generates the control command for controlling each of the power supply units to start the power supply,
  a communication unit that outputs the control command to the receiving units, and
  a storage unit configured to store identification information of each of the power supply units in a designated sequence as the control command, wherein
the control unit stores the generated control command in the storage unit in the designated sequence, and
the communication unit reads the control command from the storage unit in the designated sequence, and outputs the read control command to the power supply unit identified by the identification information in the read control command.

* * * * *